(12) United States Patent
Imamura

(10) Patent No.: US 8,284,381 B2
(45) Date of Patent: Oct. 9, 2012

(54) DISTANCE MEASURING APPARATUS AND DISTANCE MEASURING METHOD

(75) Inventor: Norihiro Imamura, Osaka (JP)

(73) Assignee: Panasonic Corporation, Osaka (JP)

( * ) Notice: Subject to any disclaimer, the term of this patent is extended or adjusted under 35 U.S.C. 154(b) by 123 days.

(21) Appl. No.: 12/865,741

(22) PCT Filed: Feb. 3, 2009

(86) PCT No.: PCT/JP2009/000413
§ 371 (c)(1),
(2), (4) Date: Aug. 2, 2010

(87) PCT Pub. No.: WO2009/098864
PCT Pub. Date: Aug. 13, 2009

(65) Prior Publication Data
US 2011/0037964 A1 Feb. 17, 2011

(30) Foreign Application Priority Data
Feb. 5, 2008 (JP) ................................ 2008-025608

(51) Int. Cl.
*G01C 3/08* (2006.01)
(52) U.S. Cl. ........ 356/3.13; 356/3.01; 356/3.1; 356/4.1; 356/5.01
(58) Field of Classification Search ........ 356/3.01–28.5, 356/139.01–139.1
See application file for complete search history.

(56) References Cited

U.S. PATENT DOCUMENTS

| 6,556,307 B1 * | 4/2003 | Norita et al. ............... 356/608 |
| 2007/0247611 A1 * | 10/2007 | Tamaki et al. ............ 356/3.11 |

FOREIGN PATENT DOCUMENTS

| JP | 07-071956 | 3/1995 |
| JP | 09-133525 | 5/1997 |
| JP | 11-072325 | 3/1999 |
| JP | 3090078 | 7/2000 |

OTHER PUBLICATIONS

International Search Report for corresponding International Application No. PCT/JP2009/000413 mailed Mar. 17, 2009.
International Preliminary Report on Patentability (IPRP) for International Application No. PCT/JP2009/000413 dated Aug. 11, 2009.

* cited by examiner

*Primary Examiner* — Luke Ratcliffe
(74) *Attorney, Agent, or Firm* — Renner, Otto, Boisselle & Sklar, LLP

(57) ABSTRACT

A distance measuring apparatus includes: a reference object; a plurality of optical systems; imaging sections for converting images of an object for distance measurement and the reference object formed in the respective imaging regions into picture data; and a calculation section. The calculation section generates a plurality of picture data of the reference object by light of a first wavelength band and a plurality of picture data of the object for distance measurement by light of a second wavelength band, the second wavelength band being longer in wavelength than is the first wavelength band. From the plurality of picture data, parallax amounts of the reference object and the object for distance measurement are calculated. A distance to the object for distance measurement is calculated based on a corrected parallax amount of the object for distance measurement.

12 Claims, 12 Drawing Sheets

(a)  (b)

(a)

(b)

(a)    (b)

(a)  (b)  (c)

(a)  (b)  (c)

(a)　　　　　　　(b)

DISTANCE MEASURING APPARATUS AND DISTANCE MEASURING METHOD

TECHNICAL FIELD

The present invention relates to a distance measuring apparatus for measuring a distance to an object by using triangulation, and in particular to a distance measuring apparatus and distance measuring method incurring few errors.

BACKGROUND ART

A distance measuring apparatus which measures a distance to an object by using triangulation usually comprises a pair of optical systems and imaging elements. For example, the pair of optical systems are disposed along the horizontal (right-left) direction or the vertical (up-down) direction, and images from light of the object respectively converged by the pair of optical systems are converted into electrical signal-based pictures by the imaging elements. This is called imaging. Moreover, in the present specification, a picture is meant to be an image containing an object as electrically converted by an imaging element. A distance measuring apparatus determines a parallax amount between two pictures that have been imaged, and measures a distance to the object by using the principle of triangulation from the parallax amount. Such distance measuring apparatuses are used for measurement of vehicular gaps between automobiles, camera auto-focus systems, three-dimensional shape measurement systems, and the like.

FIG. 21 is a diagram describing triangulation with a distance measuring apparatus. As shown in FIG. 21, regarding point P on an object O as the point to be measured, images from light of the object O are respectively formed, by an imaging lens G1 of an first imaging optical system and an imaging lens G2 of a second imaging optical system, onto an imaging plane N1 of a first imaging element and an imaging plane N2 of a second imaging element.

When point P is located on an optical axis a1 of the first imaging optical system, an image of point P is formed at a point where the imaging plane N1 intersects the optical axis a1 of the first imaging optical system. The second imaging optical system is disposed so that the optical axis a1 of the first imaging optical system and an optical axis a2 of the second imaging optical system are parallel to each other, with a predetermined interval B therebetween. A line segment connecting a point where the imaging plane N2 intersects the optical axis a2 of the second imaging optical system and the point where the imaging plane N1 intersects the optical axis a1 of the first imaging optical system is a line segment that serves as a basis of triangulation, called the base line, which does not change depending on the position of the object. The length of this base line, i.e., the base line length, is equal to the interval B. Hereinafter, the base line length is assumed to be B.

On the imaging plane N2, an image of point P is formed at a position which is distance $\Delta$ away from the optical axis a2 of the second imaging optical system along the base line. This is called a parallax, and its length is called a parallax amount $\Delta$.

Assuming that the imaging lenses G1 and G2 of the first and second imaging optical systems have a focal length f, the following approximate expression holds true.

$$\Delta \approx B \cdot \frac{f}{Z} \qquad [\text{eq. 1}]$$

The parallax amount $\Delta$ can be determined through a pattern matching of a picture obtained from the image formed on the imaging plane N1 and a picture obtained from the image formed on the imaging plane N2. Therefore, by solving (eq. 1) with respect to Z by substituting the parallax amount $\Delta$, the base line length B, and the focal length f into (eq. 1), the distance Z can be determined. Although the parallax amount $\Delta$ will be in the unit of pixels, calculation to the unit of 0.1 pixels (subpixel unit) becomes possible through interpolation processing.

Generally speaking, in an environment where a distance measuring apparatus is used, the distance measuring apparatus itself is required to be small in size, which makes it difficult to obtain a sufficiently long base line length B. As can be seen from (eq. 1), when the base line length B is short, the parallax amount $\Delta$ is also small. Thus, there is a need to obtain a high accuracy of distance measurement even in a distance measuring apparatus with a short base line length B.

However, if the parallax amount $\Delta$ is small, the accuracy of distance measurement is likely to be deteriorated due to various factors. For example, when the ambient temperature changes, the members composing the distance measuring apparatus will expand or contract correspondingly, thus causing a change in the position of the optical axes of optical systems. If the distance measuring apparatus has a complex structure, the positions of the optical axes of the optical systems will also change in a complicated manner. It is difficult to estimate the resultant amount of change in the parallax amount $\Delta$, and it is also difficult to correct the amount of change. In this case, the distance measuring apparatus cannot be used other than in a temperature range where decrease in the accuracy of distance measurement is tolerated.

Moreover, it is also possible for the positions of the optical axes to change in the case where the positions of the members or their state of assembly changes due to vibration, or where the dimensions of the members or their state of assembly changes through aging. A change in the parallax amount resulting from these will also greatly affect the accuracy of distance measurement, all the more so when the parallax amount $\Delta$ is smaller.

In order to solve such problems, Patent Document 1 proposes a method of preventing a decrease in the accuracy of distance measurement caused by changes in ambient temperature, which involves providing a temperature sensor in the distance measuring apparatus and unequivocally correcting changes in the interval between the optical axes by using a detected temperature and coefficients of linear expansion of the members.

Moreover, Patent Document 2 proposes a method of correcting the parallax amount $\Delta$ by detecting an amount of deviation of a reference object whose distance is known, in order to prevent deterioration in the accuracy of distance measurement due to vibration and aging.

[Patent Document 1] Japanese Patent No. 3090078
[Patent Document 2] Japanese Laid-Open Patent Publication No. 7-71956

DISCLOSURE OF INVENTION

Problems to be Solved by the Invention

However, the method of Patent Document 1 has a problem of correction errors occurring due to variations in the characteristics of the temperature sensor and variations in the coefficients of linear expansion of the members defining the base line length. Moreover, generally speaking, the members defining the base line length, e.g., lenses, have larger thermal capacities than the thermal capacity of the detecting portion of the temperature sensor. Therefore, when a drastic change in ambient temperature occurs, it takes time for the temperatures of the members defining the base line length to become equal to the ambient temperature, and it is difficult to perform appropriate correction during this time.

On the other hand, in the method of Patent Document 2, a reference object must be placed near the front depth of field limit of the optical system. Now, an example of imaging an object for distance measurement and a reference object in a pan-focus state (a state where the depth of field is increased so that focus is attained at short distances as well as long distances) will be described. A front depth of field limit distance A in a pan-focus state can be expressed by (eq. 2).

$$A = \frac{f^2}{(2F \cdot \delta)} \quad [\text{eq. 2}]$$

In (eq. 2), f represents focal length; F represents an F value of the optical system; and δ represents a circle of confusion. Assuming that the imaging element has a pixel pitch of 2.9 μm (which pertains to the VGA class), a focal length f of 2.8 mm, an F value of 2.8, and a circle of confusion which is twice the pixel pitch, the front depth of field limit distance A is about 241 mm from (eq. 2). Thus, in an optical system having a relatively short focal length, too, the front depth of field limit distance is 200 mm or more, thus resulting in a problem in that, if a reference object were to be incorporated in a distance measuring apparatus, the distance measuring apparatus itself would become large.

Moreover, in the distance measuring apparatuses of Patent Document 1 and Patent Document 2, the two optical systems have separate lenses and separate imaging elements. In such a construction, influences of temperature, vibration, aging of physical characteristics, and the like occur to different extents in the respective lenses and imaging elements, such that the positions of the optical axes of the optical systems at the imaging planes of the imaging elements will undergo different changes in the lenses and imaging elements of the two optical systems, thus resulting in a problem in that a proper correction of the parallax amount cannot be performed.

An objective of the present invention is to solve at least one of the aforementioned problems of the conventional techniques, and provide a small-sized distance measuring apparatus and a distance measuring method which can maintain a high accuracy of distance measurement against changes in ambient temperature and aging.

Means for Solving the Problems

A distance measuring apparatus according to the present invention is a distance measuring apparatus for measuring a distance to an object based on a parallax of images obtained with a plurality of optical systems, comprising: a reference object; a plurality of optical systems for imaging an object for distance measurement and the reference object; an imaging section having a plurality of imaging regions having a one-to-one correspondence with the plurality of optical systems, the imaging section converting images of the object for distance measurement and the reference object formed in the respective imaging regions by the plurality of optical systems into electrical signals; and a calculation section, wherein, the calculation section generates, from the electrical signals, a plurality of picture data of the reference object by light of a first wavelength band of the reference object in the plurality of imaging regions and a plurality of picture data of the object for distance measurement by light of a second wavelength band of the object for distance measurement in the plurality of imaging regions, the second wavelength band being longer in wavelength than is the first wavelength band; calculates a parallax amount of the reference object and a parallax amount of the object for distance measurement, respectively, from the plurality of picture data of the reference object and the plurality of picture data of the object for distance measurement; and based on the parallax amount of the reference object and an initial value of the parallax amount of the reference object, corrects the parallax amount of the object for distance measurement, and calculates a distance to the object for distance measurement by using the corrected parallax amount of the object for distance measurement.

In a preferred embodiment, the distance measuring apparatus further comprises an optical filter for selectively transmitting light of the second wavelength band, the optical filter being disposed on optical paths between the plurality of optical systems and the object for distance measurement, wherein the reference object emits or reflects light of the first wavelength band, and is disposed so that the emitted or reflect light reaches the plurality of optical systems without being transmitted through the optical filter.

In a preferred embodiment, the imaging regions of the imaging section include a first region in which to image the reference object and a second region in which to image the object for distance measurement; and in each imaging region, the imaging section includes at least one of a first optical filter which is provided so as to cover the first region and selectively transmits light of the first wavelength band and a second optical filter which is provided so as to cover the second region and selectively transmits light of the second wavelength band.

In a preferred embodiment, the imaging section includes in each pixel a plurality of filters for transmitting light of respectively different wavelength bands, and images the reference object and the object for distance measurement with white light; and from picture data of the reference object and the object for distance measurement by white light as obtained from the plurality of imaging elements, the calculation section generates the plurality of picture data of the reference object by light of the first wavelength band of the reference object and the plurality of picture data of the object for distance measurement by light of the second wavelength band of the object for distance measurement, the second wavelength band being different from the first wavelength band.

In a preferred embodiment, the reference object is placed near a focusing distance of the plurality of optical systems based on light of the first wavelength band.

In a preferred embodiment, each of the plurality of optical systems includes a diffractive lens having a diffraction grating formed on at least one face thereof, and the diffractive lens forms an image of the reference object with diffracted light, by a first order of diffraction, of light of the first wavelength band, and forms an image of the object for distance measurement with diffracted light, by a second order of diffraction, of light of the second wavelength band.

In a preferred embodiment, each of the plurality of optical systems includes an image-formation lens, the plurality of image-formation lenses being integrally formed.

In a preferred embodiment, the imaging section is one imaging element, such that the plurality of imaging regions are provided in the one imaging element.

In a preferred embodiment, the distance measuring apparatus further comprises a light source for emitting light of the first wavelength band, wherein the reference object causes diffuse reflection of light from the light source.

In a preferred embodiment, the reference object is a light source for emitting light of the second wavelength band.

In a preferred embodiment, the distance measuring apparatus further comprises a reflection surface which is disposed so as to allow light from the reference object to be reflected and enter the plurality of optical systems.

A distance measuring method according to the present invention is a distance measuring method, by using a distance measuring apparatus including a reference object, a plurality of optical systems for imaging an object for distance measurement and the reference object, an imaging section having imaging regions having a one-to-one correspondence with the plurality of optical systems, the imaging section converting images of the object for distance measurement and the reference object formed in the respective imaging regions by the plurality of optical systems into electrical signals, of measuring a distance to an object based on a parallax of images with the plurality of optical systems, comprising: a step of generating, from the electrical signals, a plurality of picture data of the reference object by light of a first wavelength band of the reference object in the plurality of imaging regions and a plurality of picture data of the object for distance measurement by light of a second wavelength band of the object for distance measurement in the plurality of imaging regions, the second wavelength band being different from the first wavelength band; a step of calculating the parallax amount of the reference object and the parallax amount of the object for distance measurement, respectively, from the plurality of picture data of the reference object and the plurality of picture data of the object for distance measurement; and a step of, based on the parallax amount of the object for distance measurement and an initial value of the parallax amount of the reference object, correcting the parallax amount of the object for distance measurement, and calculating a distance to the object for distance measurement by using the corrected parallax amount of the object for distance measurement.

Effects of the Invention

According to the present invention, by imaging an object for distance measurement and a reference object with different wavelengths of light, and imaging the reference object with light of a short wavelength, the focusing distance can be shortened; therefore, even if the reference object is placed at a position close to the imaging regions of the imaging elements, the reference object and the object for distance measurement can be imaged with about the same optical accuracy. This allows the reference object to be placed near the imaging sections, whereby a small-sized distance measuring apparatus can be realized.

Moreover, by using an amount of change from the initial value of a parallax amount of the reference value to correct a parallax amount of the object for distance measurement, a change in the base line length due to temperature changes, aging, and the like can be corrected. Because the object for distance measurement and the reference object are imaged with the same optical systems, the correction of a change in the base line length attains a high accuracy, whereby a highly accurate distance measuring apparatus can be realized.

Figure 1:
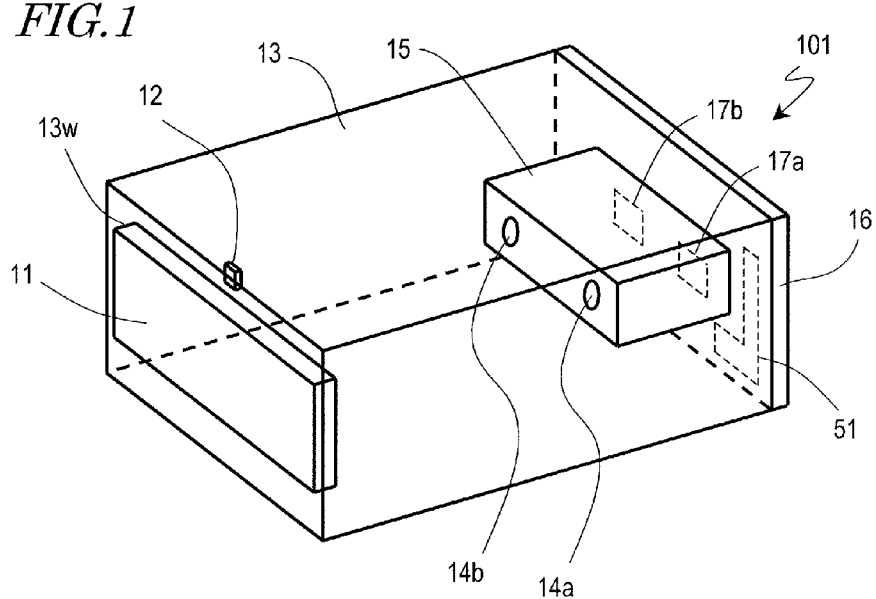
[FIG. 1] A perspective view showing a first embodiment of the distance measuring apparatus according to the present invention.

DESCRIPTION OF REFERENCE NUMERALS 10 object for distance measurement
11 optical filter
12 reference object
13 housing
22a, 22b imaging region
24a, 24b first region
23a, 23b second region
52a, 52b input section
53a, 53b driving section
54 calculation section
55a, 55b frame memory
56 coordinate conversion section
57 parallax amount conversion section
58 memory
59 parallax amount correction section
60 distance calculation section
62 output section
63 control section

BEST MODE FOR CARRYING OUT THE INVENTION

Generally speaking, the refractive index of an optical part depends on the wavelength of light which is transmitted, such that the refractive index increases for light of shorter wavelengths (wavelength dispersion of refractive index). Therefore, given the same optical system, light of a shorter wavelength forms an image at a shorter distance (the focusing distance is short), resulting in a shallower depth of field. On the other hand, light of a longer wavelength forms an image at a longer distance (the focusing distance is short), resulting in a deeper depth of field.

The distance measuring apparatus according to the present invention utilizes wavelength dispersion of refractive index in an optical system, and images an object for distance measurement and a reference object with different wavelengths of light. By imaging the reference object with light of a short wavelength, the focusing distance is shortened, so that the reference object and the object for distance measurement can be imaged by the imaging element which is placed at the same position, even if the reference object is placed at a position which is closer to an imaging region of the imaging element.

This allows the reference object to be placed at a distance on the order of e.g. several centimeters from the imaging element. Therefore, even if it is incorporated in the distance measuring apparatus, a small-sized distance measuring apparatus is realized. Moreover, it can be imaged simultaneously with the object for distance measurement.

When measuring a distance to an object for distance measurement, the object for distance measurement and a reference object are imaged, and their respective parallax amounts are determined from the imaged picture data. From the relationship of (eq. 1), a parallax amount corresponding to a predetermined distance remains constant unless the base line length fluctuates; however, the parallax amount will change if the base line length fluctuates due to temperature changes, aging, and the like. However, by constantly detecting a parallax amount acquired from the reference object, calculating an amount of change in the base line length from a difference from an initial parallax amount of the reference object, and subtracting this from the parallax amount of the object for distance measurement, the parallax amount of the object for distance measurement can be corrected. This makes it possible to correct changes in the distance measurement value due to temperature changes, aging, and the like. Since an object for distance measurement and a reference object are imaged by the same optical systems, this correction has a very high accuracy. Based on this characteristic feature, the present invention realizes a distance measuring apparatus which is capable of highly accuracy distance measurement. Hereinafter, embodiments of the present invention will be described in detail with reference to the drawings.

First Embodiment

Figure 2:
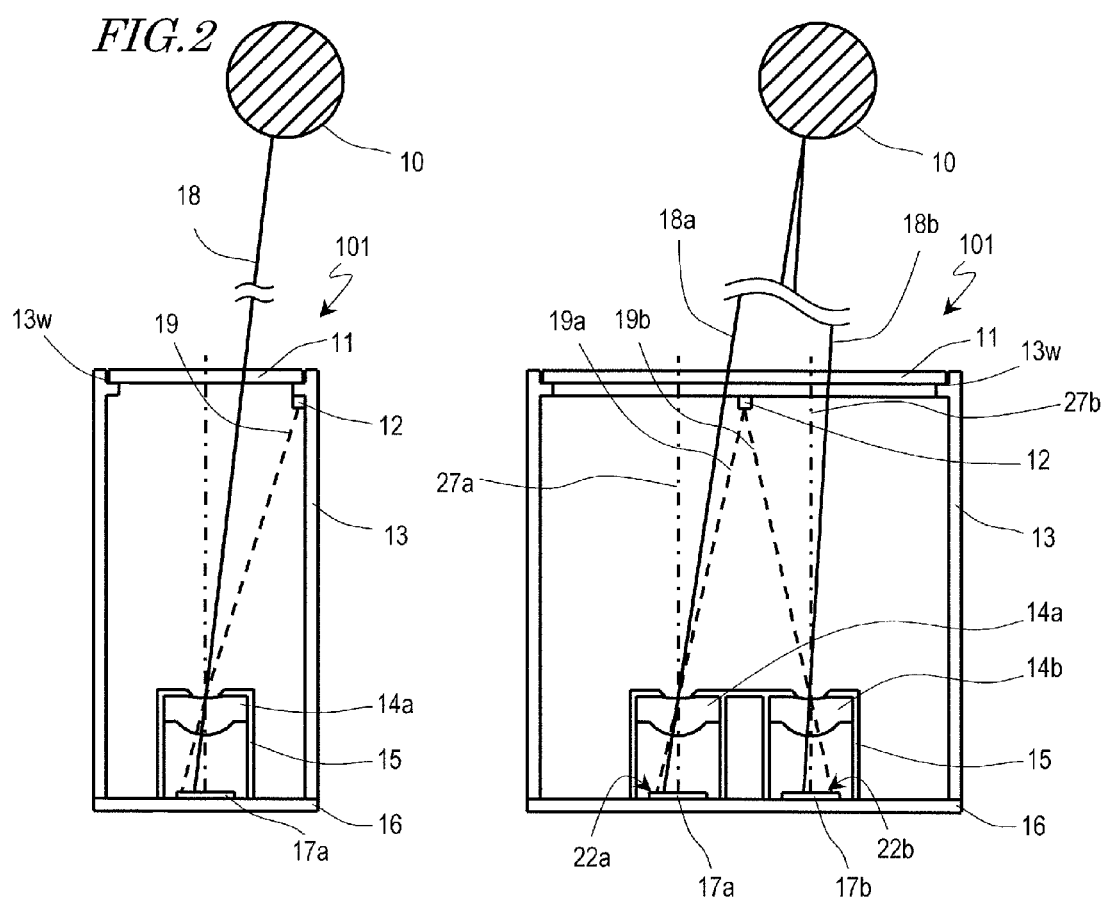
[FIG. 2] (a) is a cross-sectional view of the distance measuring apparatus of FIG. 1 as seen from a lateral direction; and (b) is a cross-sectional view as seen from an upper direction.

Hereinafter, a first embodiment of the distance measuring apparatus according to the present invention will be described. FIG. 1 is a perspective view of the distance measuring apparatus 101. FIGS. 2(a) and (b) are cross-sectional views of the distance measuring apparatus 101 as seen from a lateral direction and from an upper direction, respectively.

The distance measuring apparatus 101 includes an optical filter 11, a reference object 12, optical systems 14a and 14b, imaging sections 17a and 17b, and a signal processing circuit 51. It further includes a housing 13, a barrel 15, and a substrate 16 for accommodating or supporting these constituent elements.

The housing 13 has an opening 13w, such that the optical filter 11 is attached to the opening 13w. The reference object 12 is provided in the vicinity of the opening 13w, near the center of the opening 13w along the longitudinal direction thereof.

The substrate 16 is attached to a face of the housing 13 opposite from the face on which the opening 13w is provided. The imaging section 17a and the imaging section 17b are provided on the substrate 16. Moreover, the signal processing circuit 51 for processing picture data which is obtained with the imaging section 17a and the imaging section 17b is provided on the substrate 16.

The optical system 14a and the optical system 14b are supported by the barrel 15, with a predetermined distance between them. The barrel 15 is attached to the substrate 16, such that the optical system 14a and the optical system 14b are supported at a predetermined distance away from the imaging section 17a and the imaging section 17b attached onto the substrate 16.

In the present embodiment, the reference object 12 is a light-emitting device, and selectively emits light of a first wavelength band. Moreover, the optical filter 11 selectively transmits light of a second wavelength band. The second wavelength band is longer in wavelength than is the first wavelength band. Preferably, there is no overlap between the first wavelength band and the second wavelength band, and it is more preferable if the difference between the two wavelength bands is greater, i.e., the difference between the short-wavelength end of the second wavelength band and the long-wavelength end of the first wavelength band is greater. The reference object can be placed at a position near the imaging element, and a broad range of distance measurement can be obtained. By selective transmission, a wavelength band in which the filter has a transmittance of 90% or more is meant.

In the present embodiment, the first wavelength band is a blue band, and specifically is 440 nm to 460 nm. The second wavelength band is a near-infrared band, and specifically is 800 nm to 900 nm.

As shown in FIGS. 2(a) and (b), since the reference object 12 is provided in the vicinity of the opening 13w, an image of the reference object 12 impinges on the first optical system 14a and the second optical system 14b without being transmitted through the optical filter 11. On the other hand, an image of the object 10 for distance measurement is transmitted through the optical filter 11, and impinges on the first optical system 14a and the second optical system 14b.

The optical system 14a and the optical system 14b image the reference object and the object for distance measurement, respectively, and form their images on an imaging region 22a of the imaging section 17a and an imaging region 22b of the imaging section 17b. In the present embodiment, the optical system 14a and the optical system 14b each include only one refractive lens. However, the optical system 14a and the optical system 14b may each include a plurality of lenses. Moreover, they may include other optical parts such as reflection mirrors and prisms. The optical system 14a and the optical system 14b have the same optical characteristics.

The imaging section 17a and the imaging section 17b convert the optical images of the reference object 12 and the object 10 for distance measurement, which are formed by the optical system 14a and the optical system 14b, into electrical signals. These signals are analog signals of images appearing in the imaging regions. Since the reference object 12 and the object 10 for distance measurement impinge on the imaging section 17a and the imaging section 17b in the form of images by light of the first wavelength band and light of a second wavelength band, the imaging section 17a and the imaging section 17b at least detect light of the first wavelength band and light of the second wavelength band.

Figure 3:
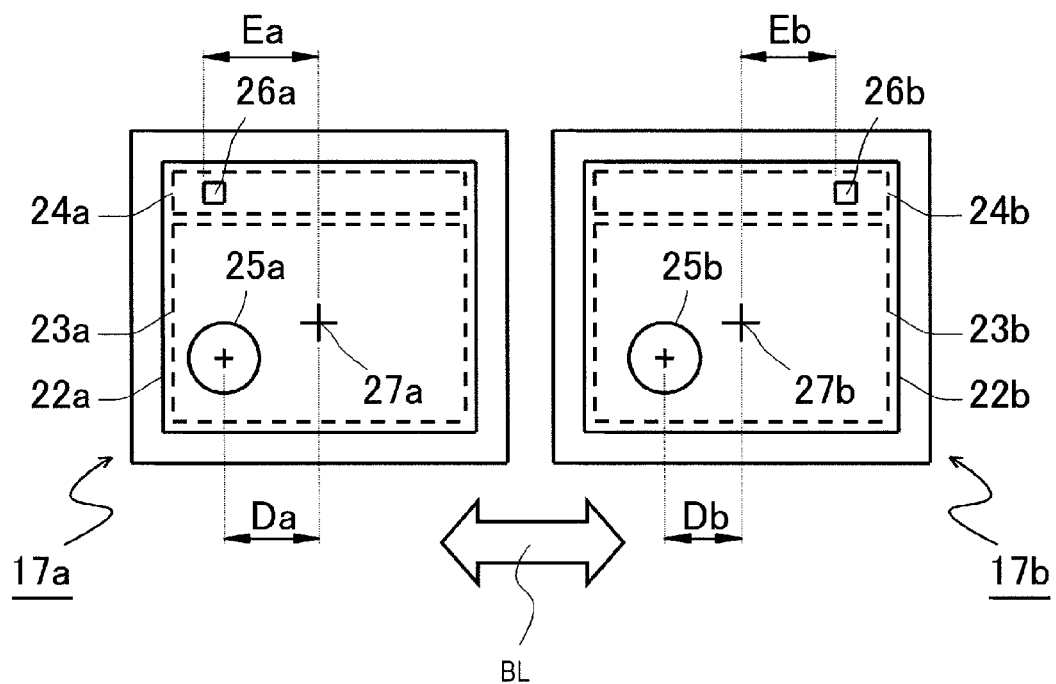
[FIG. 3] A plan view showing imaging regions of the distance measuring apparatus of FIG. 1.

As the imaging section 17a and the imaging section 17b, known image sensors such as CCD image sensors or CMOS image sensors for use in digital cameras and the like can be used. FIG. 3 is a diagram schematically showing images of the object 10 for distance measurement and the reference object 12 appearing in the imaging regions 22a and 22b of the imaging sections 17a and 17b. As shown in FIGS. 2(a) and (b), light from an image of an object whose distance is to be measured, e.g., the object 10 for distance measurement, is transmitted through the optical filter 11, converged by the optical systems 14a and 14b, and forms images in second regions 23a and 23b of the imaging regions 22a and 22b. For example, the object 10 for distance measurement appears as images 25a and 25b in the second regions 23a and 23b of the imaging regions 22a and 22b. On the other hand, the reference object 12, which is disposed outside the opening 13w at which the optical filter 11 is provided, appears as images 26a and 26b in first regions 24a and 24b of the imaging regions 22a and 22b.

Figure 5:
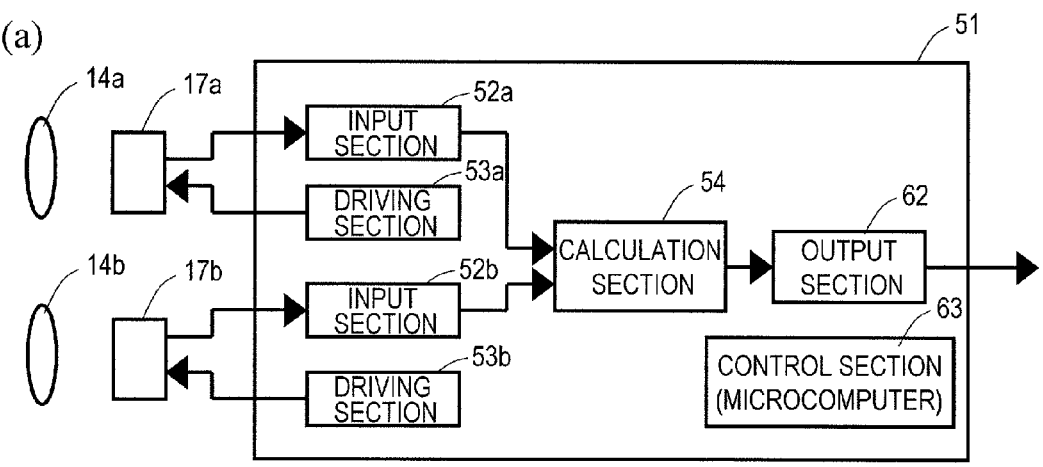
[FIGS. 5] (a) and (b) are block diagrams showing an exemplary construction of a signal processing circuit and a calculation section in the distance measuring apparatus of FIG. 1.
Figure 5:
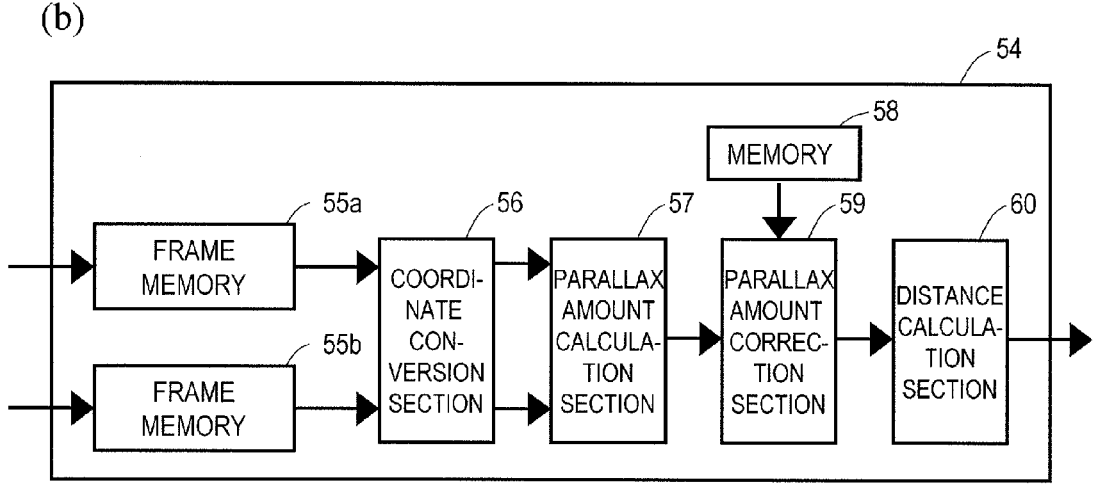

FIG. 5(a) is a block showing the construction of the signal processing circuit 51. The signal processing circuit 51 includes input sections 52a and 52b, driving sections 53a and 53b, a calculation section 54, an output section 62, and a control section 63. The control section 63 controls all of these constituent elements. Among these constituent elements, the calculation section 54 may be implemented in hardware to realize the functions described below, or may be implemented in software.

The driving sections 53a and 53b drives the imaging section 17a and the imaging section 17b. Specifically, the imaging section 17a and the imaging section 17b are driven so that, with predetermined timing, the respective pixels composing the imaging region 22a of the imaging section 17a and the imaging region 22b of the imaging section 17b are initialized, and a charge which is in accordance with the intensity of light radiated onto each pixel of the imaging regions 22a and 22b is read from the imaging section 17a or the imaging section 17b and output to the input section 52a or 52b.

For example, the input sections 52a and 52b may include correlated double sampling circuits, auto-gain circuits, A/D conversion circuits, and the like, and remove the influence of noise from electrical signals which are received from the driving sections 53a and 53b, and after adjusting their signal intensity, convert them into digital signals. As a result, picture data of the imaging regions is obtained.

FIG. 5(b) is a block diagram showing a detailed construction of the calculation section 54. The calculation section 54 includes frame memories 55a and 55b, a coordinate conversion section 56, a parallax amount calculation section 57, a parallax amount correction section 59, a memory 58, and a distance calculation section 60.

The frame memories 55a and 55b respectively receive picture data of the imaging regions from the input sections 52a and 52b, and store it. From time to time, the coordinate conversion section 56 receives the picture data of the imaging regions stored in the frame memories 55a and 55b, and converts the coordinates of the picture data so that it will become optimum data for determining parallax amounts.

Within the picture data of the imaging regions 22a and 22b, the parallax amount calculation section 57 uses the picture data concerning the first region 24a of the imaging section 17a and the first region 24b of the imaging section 17b to determine a parallax amount of the reference object. Moreover, by using the data concerning the second region 23a of the imaging section 17a and the first region 23b of the imaging section 17b, it determines a parallax amount of the object for distance measurement. A parallax amount can be determined by ascertaining a cross-correlation between the picture data of the imaging region 22a and the picture data of 22b. For example, in order to determine the parallax amount of the reference object 12, a partial picture containing the image 26b of the reference object 12 is cut out from the picture data of the first region 24b, and while shifting this partial picture along the base line direction from the corresponding position in the first region 24a, a correlation between the pictures is established. The correlation calculation can be made by SAD (an algorithm which sums absolute values of brightness differences), for example. An amount of shift which corresponds to the smallest of the correlation values is the parallax amount. By a similar method, the parallax amount of the object 10 for distance measurement is also calculated.

An initial value of the parallax amount of the reference object is stored in the memory 58. The parallax amount correction section 59 receives the parallax amount of the reference object from the parallax amount calculation section 57, and calculates an amount of change from the initial value. Then, from the amount of change in the parallax amount of the reference object, an amount of change in the base line length is calculated, and the amount of change in the base line length is subtracted from the parallax amount of the object for distance measurement, thus obtaining a parallax amount of the object for distance measurement from which the amount of change has been subtracted.

From the parallax amount of the object for distance measurement from which the amount of change has been subtracted, the distance calculation section 60 determines the distance to the object for distance measurement, based on (eq. 1).

The output section 62 receives the data of the determined distance to the object for distance measurement, and outputs the distance data to an external device. A display section may be provided in the distance measuring apparatus 101, and the distance may be displayed on the display section.

Figure 6:
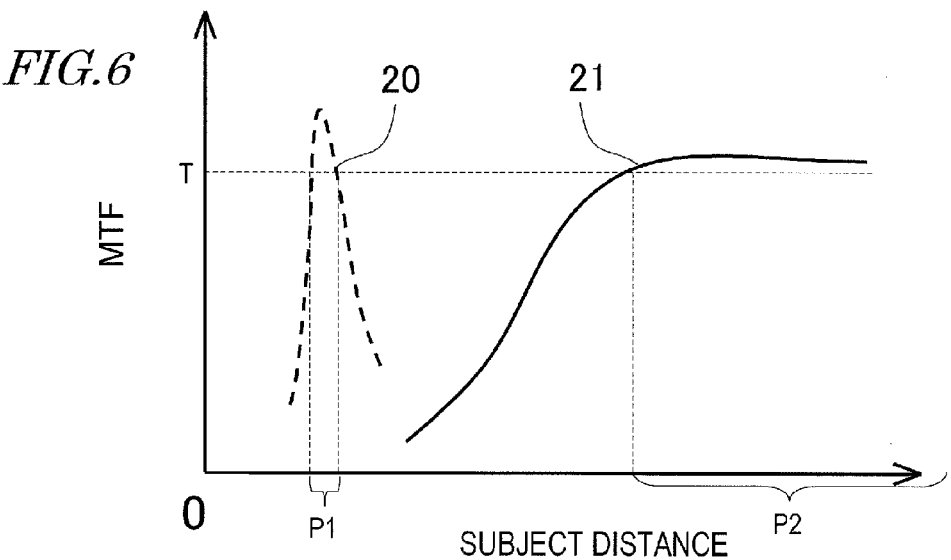
[FIG. 6] A diagram showing a relationship between subject distance and MTF in the distance measuring apparatus of FIG. 1.

Next, optical characteristics of the present embodiment will be described. FIG. 6 is a graph showing a relationship between subject distance and MTF (Modulated Transfer Function) representing lens resolution in the optical systems of the present embodiment. In FIG. 6, a curve 20 represents an MTF of blue light, which is light of the first wavelength band, whereas a curve 21 represents an MTF of light of the second wavelength band (near-infrared light). As can be seen from the curve 21 in FIG. 6, because of a pan-focus setting, light of the second wavelength band has a large MTF value except when the subject distance is short.

On the other hand, light of the first wavelength band has a short focusing distance because the wavelength is relatively short as compared to the second wavelength band. Moreover, generally speaking, the depth of field become shallower as the focusing distance becomes shorter. Therefore, light of the first wavelength band has a large MTF value in a narrow range of short distances.

Since the distance measuring apparatus according to the present invention images an object for distance measurement, and calculates a parallax amount through matching of the resultant pictures, a more accurate parallax amount can be obtained as the resultant pictures have a higher resolution. Therefore, in order to obtain an MTF value indicated by a broken line T as shown in FIG. 6, for example, the reference object 12 may be placed so that the length of optical paths 19 from the reference object 12 to the imaging sections 17a and 17b as shown in FIGS. 2(a) and (b) falls within a range of subject distance indicated as P1. At this time, the distance measuring apparatus 101 can accurately measure a distance to any object 10 for distance measurement such that the length of optical paths 18a and 18b from the object 10 for distance measurement to the imaging sections 17a and 17b falls within a range of subject distance indicated as P2.

An exemplary design of the optical systems of the present embodiment will be described. Table 1 to Table 3 show design parameters of the optical systems 14a and 14b.

TABLE 1 object for distance measurement
wavelength = 850 nm, focal length = 2.8 mm,
effective F value = 2.79
angle of view 2ω = 47.5°, effective
imaging circle diameter = φ2.32 mm

| surface number | ri | di | nd | νd |
|---|---|---|---|---|
| object | ∞ | 400 | — | — |
| aperture | ∞ | 0.03 | — | — |

TABLE 1-continued object for distance measurement
wavelength = 850 nm, focal length = 2.8 mm,
effective F value = 2.79
angle of view 2ω = 47.5°, effective
imaging circle diameter = φ2.32 mm

| surface number | ri | di | nd | νd |
|---|---|---|---|---|
| R1 surface | −6 | 1.3 | 1.585 | 30 |
| R2 surface | −1.36 | 3 | — | — |
| image surface | ∞ | — | — | — |

TABLE 2 object for distance measurement
wavelength = 450 nm, focal length = 2.62 mm,
effective F value = 2.92
angle of view 2ω = 48.6°, effective
imaging circle diameter = φ2.32 mm

| surface number | ri | di | nd | νd |
|---|---|---|---|---|
| object | ∞ | 33 | — | — |
| aperture | ∞ | 0.03 | — | — |
| R1 surface | −6 | 1.3 | 1.585 | 30 |
| R2 surface | −1.36 | 3 | — | — |
| image surface | ∞ | — | — | — |

TABLE 3 aspheric coefficient

| surface number | k | A4 | A6 | A8 | A10 | A12 |
|---|---|---|---|---|---|---|
| R1 surface | 0 | −0.065739 | −1.381955 | 12.844433 | −53.309699 | 78.403120 |
| R2 surface | −0.911166 | −0.046437 | −0.057800 | 0.262652 | −0.498069 | 0.289583 |

The optical system 14a and the optical system 14b are lenses with the same characteristics, each having an R1 surface and an R2 surface. ω represents a half angle of view along diagonals; ri represents a radius of curvature (mm) of each surface; di represents an inter-surface-center interval (mm) of each surface; nd represents a refractive index of the lens; and νd represents an Abbe number of the lens. Moreover, an aspherical shape is expressed by (eq. 3), where r is a paraxial radius of curvature; k is a conical constant; and $A_m$ (m=4,6,8,10,12) is an $m^{th}$ aspheric coefficient, assuming that distance from a tangent plane of the surface vertex along the optical axis direction is x, and that height from the optical axis is h.

$$x = \frac{\frac{1}{r}h^2}{1+\sqrt{1-(1+k)\left(\frac{1}{r}\right)^2 h^2}} + \quad [\text{eq. 3}]$$

$$A_4 h^4 + A_6 h^6 + A_8 h^8 + A_{10} h^{10} + A_{12} h^{12}$$

Figure 7:
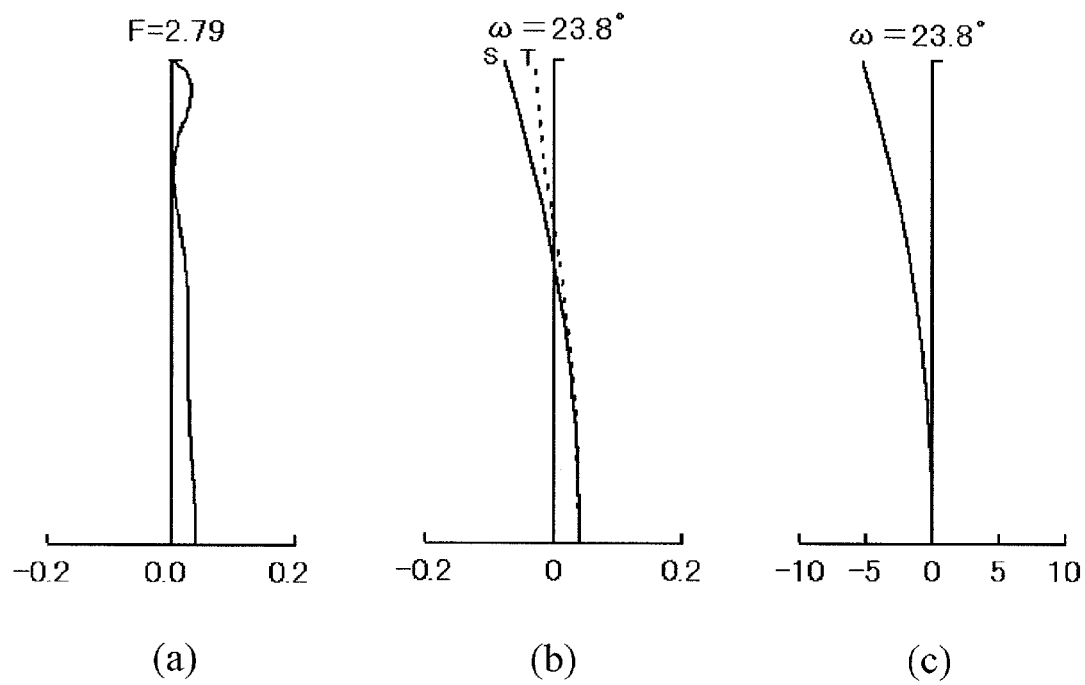
[FIG. 7] (a) to (c) are diagrams showing spherical aberration, astigmatism, and distortion in the case where an object at a position of 400 mm from imaging sections is imaged by using light of a wavelength of 850 nm in the optical systems of the distance measuring apparatus of FIG. 1.
Figure 8:
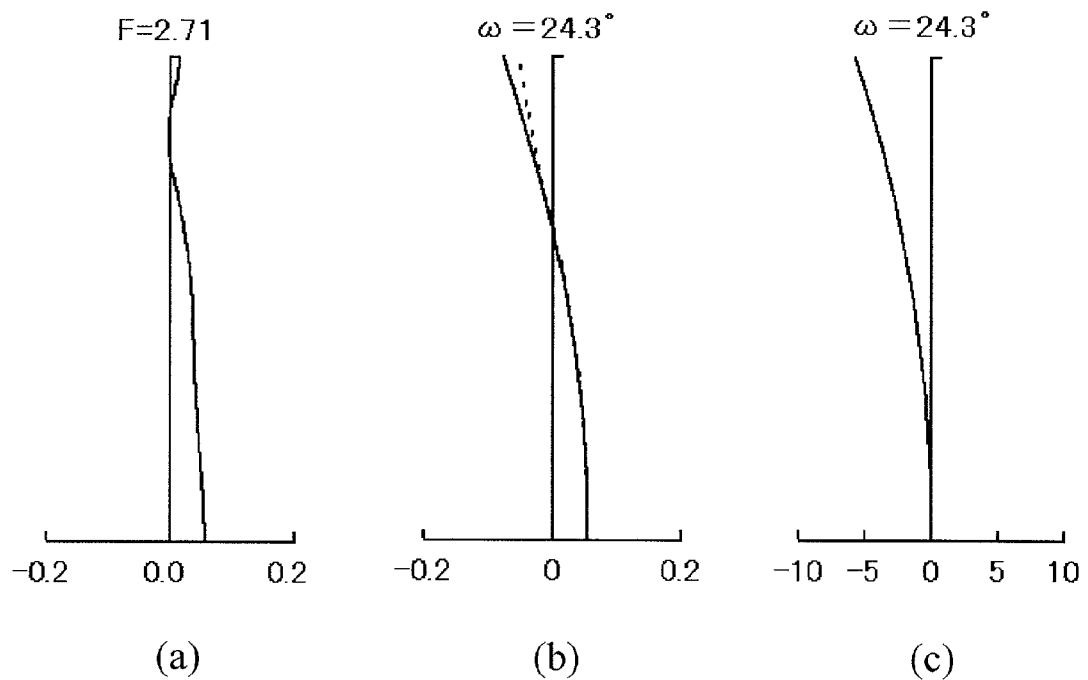
[FIG. 8] (a) to (c) are diagrams showing spherical aberration, astigmatism, and distortion in the case where an object at a position of 33 mm from imaging sections is imaged by using light of a wavelength of 450 nm in the optical systems of the distance measuring apparatus of FIG. 1.

FIGS. 7(a) to (c) are aberration diagrams showing spherical aberration, astigmatism, and distortion of an object for distance measurement which is at 400 mm from the imaging sections 17a and 17b, in the case where the optical systems 14a and 14b have the optical characteristics shown in Table 1 and where light of a wavelength of 850 nm is used as light of the second wavelength band. FIGS. 8(a) to (c) are aberration diagrams showing spherical aberration, astigmatism, and distortion of a reference object which is at 33 mm from the imaging sections 17a and 17b, in the case where the optical systems 14a and 14b have the optical characteristics shown in Table 1 and where light of a wavelength of 450 nm is used as light of the first wavelength band. As is clear from a comparison between FIGS. 7(a) to (c) and FIGS. 8(a) to (c), the optical performances in the two cases are about the same. This indicates that about the same optical performance can be obtained between the case where an object for distance measurement is placed at a position of 400 mm and imaged with a wavelength of 850 nm (near-infrared light) and the case where a reference object is placed at a position of 33 mm and imaged with a wavelength of 450 nm (blue light). Thus, through imaging with light of a short wavelength, even if the reference object is placed at a position on the order of several centimeters from the imaging sections, its picture can be imaged with similar optical characteristics to those of an object for distance measurement which is far. Therefore, the parallax amount of the object for distance measurement can be correctly corrected by using a parallax amount which is obtained with a picture of the reference object thus placed.

Next, with reference to FIG. 3, the method of parallax correction and the method of measuring a distance to an object for distance measurement according to the present embodiment will be described in more detail. As described earlier, the images 26a and 26b of the reference object 12 appear in the first regions 24a and 24b in the imaging regions 22a and 22b of the imaging sections 17a and 17b, whereas the images 25a and 25b of the object 10 for distance measurement appear in the second regions 23a and 23b. Optical axes 27a and 27b of the optical systems 14a and 14b intersect the imaging regions 22a and 22b at positions indicated as +.

As shown in FIGS. 2(a) and (b), since the reference object 12 is located between the two optical axes 27a and 27b, in the imaging regions 22a and 22b, the images 26a and 26b of the reference object 12 appear outside the positions of the optical axes 27a and 27b along the base line direction. Moreover, in the case where the object 10 for distance measurement is located outside the two optical axes 27a and 27b as shown in FIGS. 2(a) and (b), in the imaging regions 22a and 22b, the images 25a and 25b of the object 10 for distance measurement are shifted with respect to the optical axes 27a and 27b toward one side along the base line direction.

In this case, parallax amounts ΔE and ΔD of the reference object 12 and the object 10 for distance measurement are expressed by (eq. 4) and (eq. 5) below.

$$\Delta D = Da - Db \quad [\text{eq. 4}]$$

$$\Delta E = Ea + Eb \quad [\text{eq. 5}]$$

The distance measuring apparatus 101 has an initial value of the parallax amount ΔE of the object 10 for distance measurement stored in the memory 58 (FIG. 5(b)) as an initial value at manufacture.

At the time of distance measurement, the base line length will have changed from its initial value due to temperature changes, aging, and the like. Therefore, a base line length which has fluctuated from the initial value must be used in order for the parallax amount of the object for distance measurement and the parallax amount of the reference object at the time of distance measurement to satisfy (eq. 1). However, the amount of change in the base line length depends on a number of factors, such as change in the distance between optical axes due to temperature changes of the optical systems 14a and 14b, change in the positions at which the optical systems 14a and 14b are attached due to vibration and aging, and so on, and it is difficult to directly determine the amount of change in the base line length.

However, by constantly detecting a parallax amount which is obtained from the reference object, and taking a difference from the initial parallax amount when performing a distance measurement, an amount of change in the base line length can be calculated. Since the object for distance measurement and the reference object are imaged by the same optical systems, the amount of change in the base line length is shared. Therefore, by subtracting the amount of change in the base line length from the parallax amount acquired from the object for distance measurement, the parallax amount of the object for distance measurement can be corrected.

Figure 4:
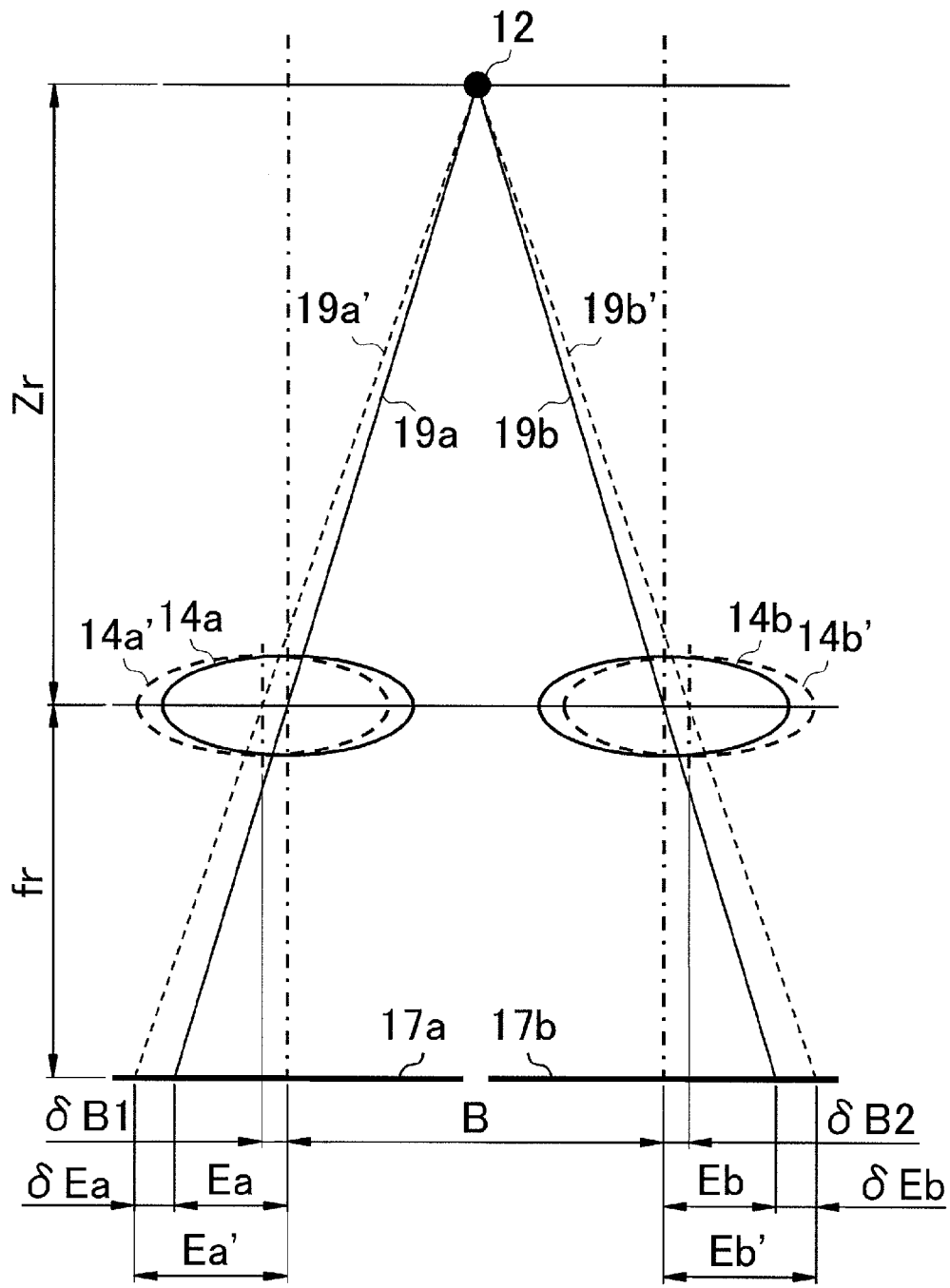
[FIG. 4] A diagram showing a method of, in the case where the base line length changes in the distance measuring apparatus of FIG. 1, calculating an amount of change in the base line length from an amount of change in the parallax amount of a reference object.

FIG. 4 is a diagram describing a method of calculating an amount of change in the base line length from an amount of change in the parallax amount of the reference object, in the case where the base line length of the distance measuring apparatus 101 has changed due to a temperature change or the like.

In FIG. 4, Zr represents a distance from the optical systems 14a and 14b to the reference object 12; fr represents a focal length of the optical systems 14a and 14b at the central wavelength of the first wavelength band; and B represents an initial value of the base line length.

The initial value of the parallax amount of the reference object 12 is ΔE=Ea+Eb, as expressed by (eq. 5).

It is assumed that the optical systems 14a and 14b have moved to the positions indicated as optical systems 14a' and 14b' due to a temperature change or the like at the time of distance measurement. Although the positions of the optical axes of the optical systems 14a' and 14b' have also moved due to the temperature change, the coordinate system of parallax calculation remains unchanged, so that a parallax amount ΔE' of the reference object at the time of distance measurement is detectable as Ea'+Eb' from the pictures at the imaging sections. An amount of change δE in the parallax amount of the reference object 12 from its initial value ΔE is expressed by (eq. 6) below.

$$\delta E = \delta Ea + \delta Eb \quad [\text{eq. 6}]$$

Herein, δEa and δEb represent amounts of change in the positions of the images 26a and 26b of the reference object 12 at the imaging sections 17a and 17b (FIG. 3).

In FIG. 4, δB1 and δB2 represent amounts of move of the optical axes caused by the optical systems 14a and 14b having moved to the positions indicated as optical systems 14a' and 14b', respectively. δB1 can be expressed by (eq. 7) below, from a similarity relationship between a triangle having a vertex at the position of the reference object 12 and having a height Zr and a base length of δB1 and a triangle having a vertex at the position of the reference object 12 and having a height of Zr+fr and a base length of δEa. For like reasons, δB2 can be expressed by (eq. 8).

$$\delta B1 = \frac{Zr \cdot \delta Ea}{(Zr + fr)} \quad [\text{eq. 7}]$$

$$\delta B2 = \frac{Zr \cdot \delta Eb}{(Zr + fr)} \quad [\text{eq. 8}]$$

Since a sum of the amounts of change in the optical axes of the optical systems 14a and 14b is the amount of change in the base line length, the amount of change in the base line length, denoted as δB, can be expressed by (eq. 9) below, by using the relationship of (eq. 6).

$$\delta B = \frac{Zr \cdot (\delta Ea + \delta Eb)}{(Zr + fr)} = \frac{Zr \cdot \delta E}{(Zr + fr)} \quad [\text{eq. 9}]$$

By using the relationship of (eq. 9), the amount of change δB in the base line length can be calculated from the amount of change δE, which is obtained by subtracting the value ΔE' at the time of distance measurement from the initial value ΔE of parallax amount of the reference object 12.

Assuming that the detected parallax amount of the object for distance measurement at the time of distance measurement is ΔD', the parallax amount ΔD' contains the amount of change in the base line length. Therefore, a corrected parallax amount ΔDc' of the object for distance measurement, from which the amount of change in the base line length is discounted, is expressed by (eq. 10).

$$\Delta Dc' = \Delta D' - \delta B \quad [\text{eq. 10}]$$

Thus, it is possible to correct the change in the base line length due to temperature changes, aging, and the like. Since the object for distance measurement and the reference object are imaged by the same optical systems 14a and 14b, the correction of the change in the base line length has a very high accuracy.

As described earlier, the procedure of distance measurement is as follows. First, the light-emitting device which is the reference object 12 is allowed to emit light, and the reference object is imaged with light of the first wavelength band, and from the resultant picture data, the parallax amount calculation section 57 determines an initial parallax amount ΔE of the reference object. The initial value ΔE of parallax amount having been determined is stored to the memory 58.

At the time of distance measurement, in order that the object 10 for distance measurement and the reference object 12 are simultaneously imaged, the object 10 for distance measurement is imaged with light of the second wavelength band while allowing the light-emitting device which is the reference object 12 to emit light of the first wavelength band. From the respective picture data, the parallax amount calculation section 57 calculates the parallax amounts ΔE' and ΔD' of the reference object 12 and the object 10 for distance measurement. The parallax amount correction section 59 reads the initial value ΔE of the parallax amount of the reference object 12 from the memory 58, determines the amount of change δE from the parallax amount ΔE' of the reference object and the initial value ΔE of the parallax amount, and calculates the amount of change δB in the base line length from (eq. 9). By subtracting the resultant δB from the parallax amount ΔD' of the object for distance measurement, the corrected parallax amount ΔDc of the object for distance measurement is calculated. In this manner, the parallax amount of the object for distance measurement can be corrected based on the parallax amount of the reference object and the initial value of the parallax amount of the reference object at the time of distance measurement.

The distance calculation section 60 receives the resultant corrected parallax amount ΔDc' of the object for distance measurement, and substitutes it for the Δ in (eq. 1), thus calculating the distance Z to the object 10 for distance measurement. Since the base line length at the time of distance measurement has changed to B+δB, B+δB is used as the base line length. However, since δB is very small relative to B and therefore is negligible, the distance Z may be calculated by using the initial value B as the base line length.

Thus, the distance measuring apparatus 101 images an object for distance measurement and a reference object with different wavelengths of light. By imaging the reference object with light of a short wavelength, the focusing distance can be shortened; therefore, even if the reference object is placed at a position close to the imaging regions of the imaging elements, the reference object and the object for distance measurement can be imaged with about the same optical accuracy. This allows the reference object to be placed near the imaging sections, whereby a small-sized distance measuring apparatus can be realized.

Moreover, since an amount of change from the initial value of a parallax amount of the reference value is used to correct a parallax amount of the object for distance measurement, a change in the base line length due to temperature changes, aging, and the like can be corrected. Since the object for distance measurement and the reference object are imaged by the same optical systems, the correction of the change in the base line length has a very high accuracy. Therefore, a highly accurate distance measuring apparatus can be realized.

Therefore, a small-sized distance measuring apparatus can be provided which is capable of correcting a distance measurement value with a high accuracy even in an environment with a broad temperature range and drastic temperature changes, e.g., on-board applications, or in an environment where aging is possible.

In the present embodiment, the object for distance measurement is irradiated with external natural light or an external light source, and light reflected from the object for distance measurement is imaged as the object for distance measurement. However, in an environment where imaging with near-infrared light is difficult, e.g., at night or in an indoor space, the object for distance measurement may be irradiated with near-infrared light by providing an auxiliary light source such as a near-infrared LED in the distance measuring apparatus 101, or by separately employing an auxiliary light source.

In the present embodiment, an optical filter is used in which a dielectric multilayer film or the like that transmits a near-infrared light wavelength band and reflects a visible light wavelength band is formed on a glass surface. However, an optical filter may be used in which a light-absorbing substance dispersed in glass absorbs visible light, such that near-infrared light is transmitted.

In the present embodiment, the object for distance measurement is imaged with a near-infrared light wavelength band, and the reference object is imaged with a blue light wavelength band based on a blue LED. However, the wavelength band of the object for distance measurement and the wavelength band and light source type of the reference object are not limited thereto.

In the present embodiment, two optical systems are employed. However, the present invention may be implemented as a distance measuring apparatus having three or more optical systems.

In the present embodiment, there is one reference object. However, two or more reference objects may be provided, and changes in two or more detected parallax amounts may be averaged or interpolated to improve the accuracy of distance measurement.

Second Embodiment

Figure 9:
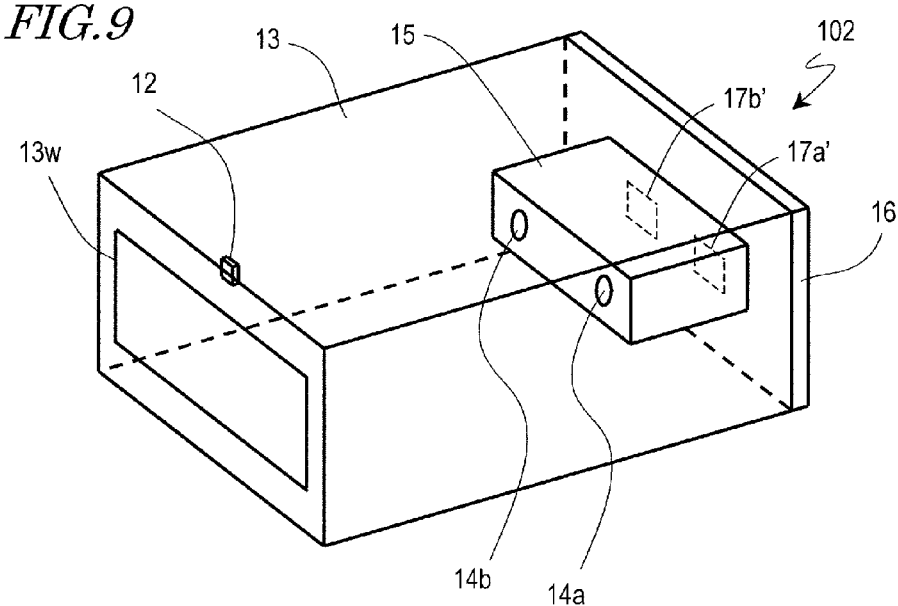
[FIG. 9] A perspective view showing a second embodiment of the distance measuring apparatus according to the present invention.
Figure 10:
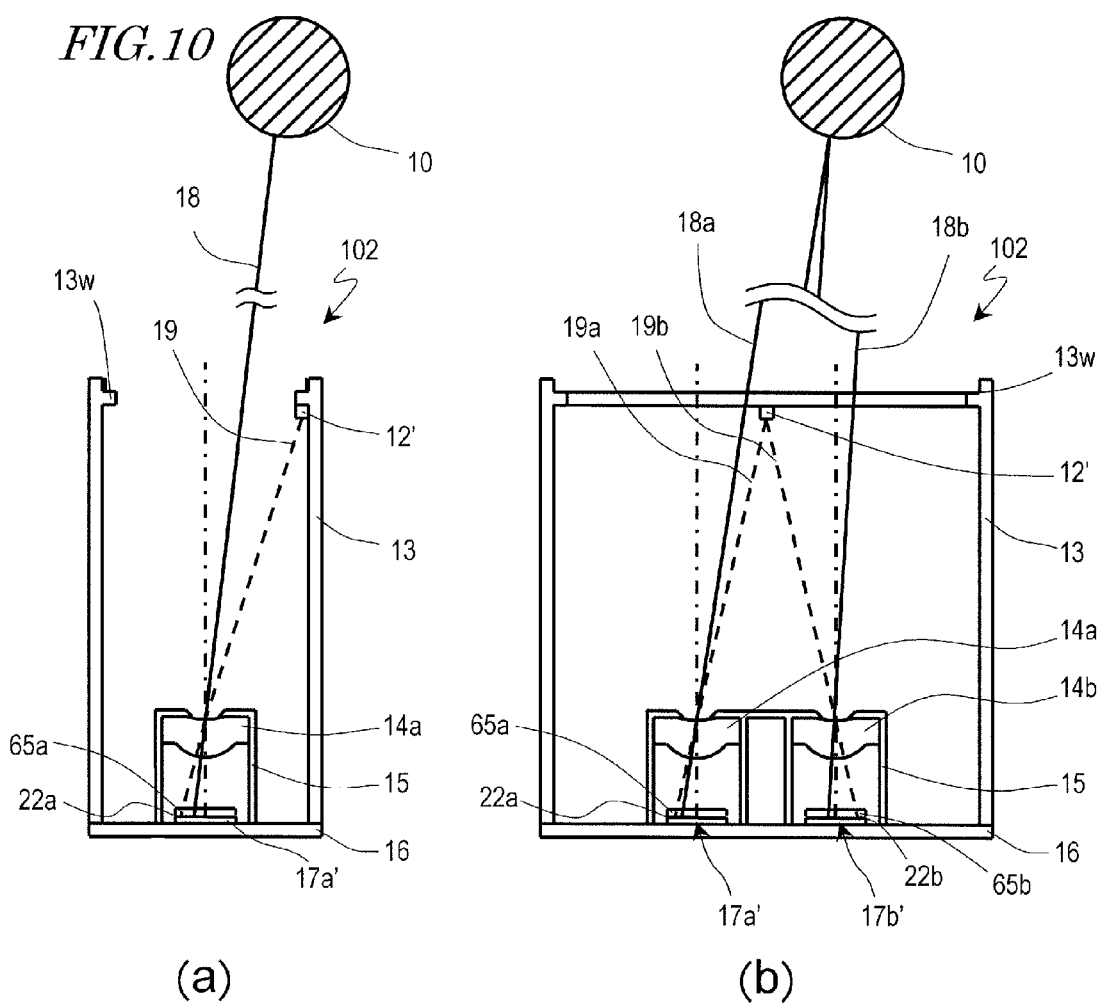
[FIG. 10] (a) is a cross-sectional view of the distance measuring apparatus of FIG. 9 as seen from a lateral direction; and (b) is a cross-sectional view as seen from an upper direction.

Hereinafter, a second embodiment of the distance measuring apparatus according to the present invention will be described. FIG. 9 is a perspective view of a distance measuring apparatus 102. FIGS. 10(a) and (b) are cross-sectional views of the distance measuring apparatus 102 as seen from a lateral direction and from an upper direction, respectively.

The distance measuring apparatus 102 differs from the distance measuring apparatus 101 of the first embodiment in that no optical filter is provided in the opening 13w of the housing 13, and that imaging sections 17a' and 17b' having filter portions 65a and 65b which respectively cover the imaging regions 22a and 22b are comprised. Moreover, although the reference object 12 in the first embodiment is a light-emitting device which emits light of the first wavelength band, the distance measuring apparatus 102 includes a light-emitting device which emits white light as a reference object 12'. Moreover, the reference object 12' is disposed at a focusing distance of the optical systems 14a and 14b based on light of the first wavelength band, away from the imaging sections 17a' and 17b'. Although nothing is provided in the opening 13w of the housing 13 in FIG. 9 and FIGS. 10(a) and (b), the opening 13w may be covered with a transparent plate which transmits white light, for example, for intrusion of dust and the like and protection of the interior of the housing 13.

Figure 11:
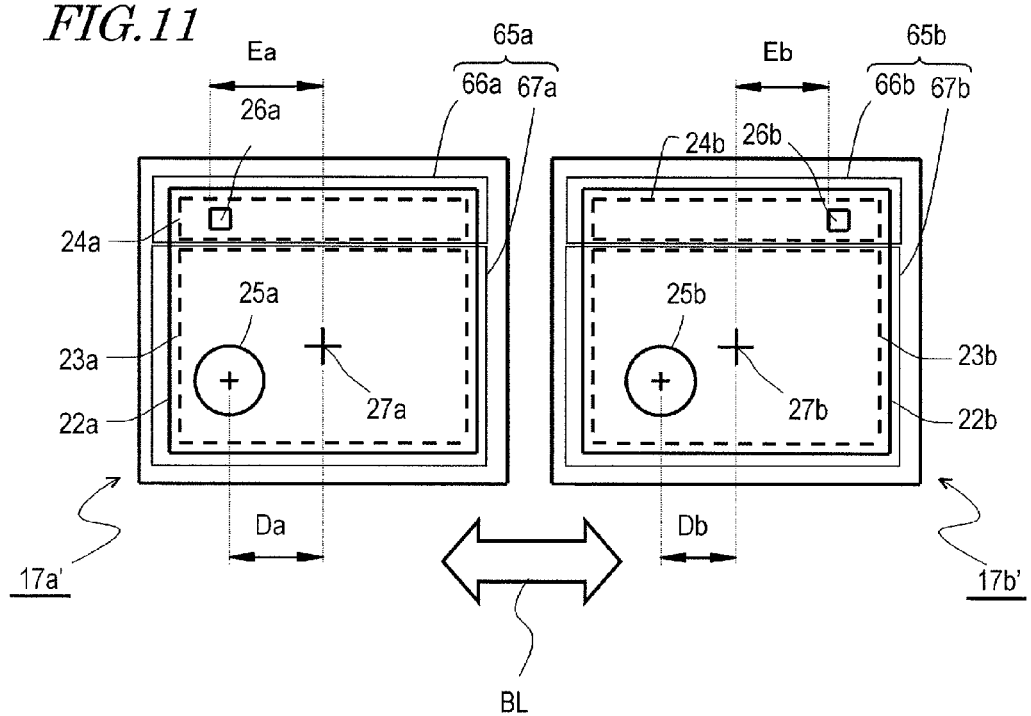
[FIG. 11] A plan view showing imaging regions of the distance measuring apparatus of FIG. 9.

FIG. 11 is a plan view showing the imaging regions 22a and 22b of the imaging sections 17a' and 17b'.

The imaging regions 22a and 22b are covered by the filter portions 65a and 65b, respectively. In the imaging region 22a, the filter portion 65a includes a first optical filter 66a covering the first region 24a and a second optical filter 67a covering the second region 23a. Similarly, in the imaging region 22b, the filter portion 65b includes a first optical filter 66b covering the first region 24b and a second optical filter 67b covering the second region 23b. The first optical filters 66a and 66b each have characteristics such that light of the first wavelength band is transmitted therethrough, whereas the second optical filters 67a and 67b have characteristics such that light of the second wavelength band is transmitted therethrough.

As in the first embodiment, the second wavelength band is longer in wavelength than is the first wavelength band. Moreover, in the present embodiment, the first wavelength band is a blue band, whereas the second wavelength band is a near-infrared band.

In the present embodiment, the reference object emits white light, and an image of the object for distance measurement impinges on the distance measuring apparatus 102 also in the form of white light. Therefore, the image of the reference object and the image of the object for distance measurement by white light are converged by the optical systems 14a and 14b, and form images in the imaging regions 22a and 22b of the imaging sections 17a' and 17b' with axial chromatic aberration occurring therein. Therefore, so far as white light is concerned, the images of the reference object 12' and the object 10 for distance measurement are not formed with a high resolution.

However, the imaging regions 22a and 22b are covered with the filter portions 65a and 65b in the imaging sections 17a' and 17b'. Therefore, in the first regions 24a and 24b of the imaging regions 22a and 22b, the reference object 12' is imaged with light of the first wavelength band, e.g., blue light; and in the second regions 23a and 23b, the object 10 for distance measurement is imaged with light of the second wavelength band, e.g., near-infrared light. As a result, by light of the first wavelength band, a high resolution is obtained in the first regions 24a and 24b of the imaging regions 22a and 22b because of the reference object 12' being placed at the focusing distance based on the first wavelength band. So long as being imaged by light of the second wavelength band, the object 10 for distance measurement also satisfies the relationship between the subject distance and the MTF value as shown by the curve 21 in FIG. 6. Thus, as in the first embodiment, by imaging the reference object with light of a short wavelength, the focusing distance can be shortened, and even if the reference object is placed at a position close to the imaging regions of the imaging elements, the reference object and the object for distance measurement can be imaged with about the same optical accuracy. This allows the reference object to be placed near the imaging sections, whereby a small-sized distance measuring apparatus can be realized.

Moreover, by using an amount of change from the initial value of a parallax amount of the reference value to correct a parallax amount of the object for distance measurement, a change in the base line length due to temperature changes, aging, and the like can be corrected. Because the object for distance measurement and the reference object are imaged with the same optical systems, the correction of a change in the base line length has a very high accuracy. Therefore, a highly accurate distance measuring apparatus can be realized.

Although a white light-emitting device is used as the reference object 12' in the present embodiment, a device which emits light of the first wavelength band may alternatively be used, as in the first embodiment. In this case, the first optical filters 66a and 66b in the filter portions 65a and 65b do not need to be provided. Moreover, as the reference object 12', a transparent plate may be used which is placed in a portion of the periphery of the opening 13w so as to scatter-transmit external white light, and what is obtained by forming a pattern, e.g. stripes, on a transparent plate may be used.

Third Embodiment

Figure 12:
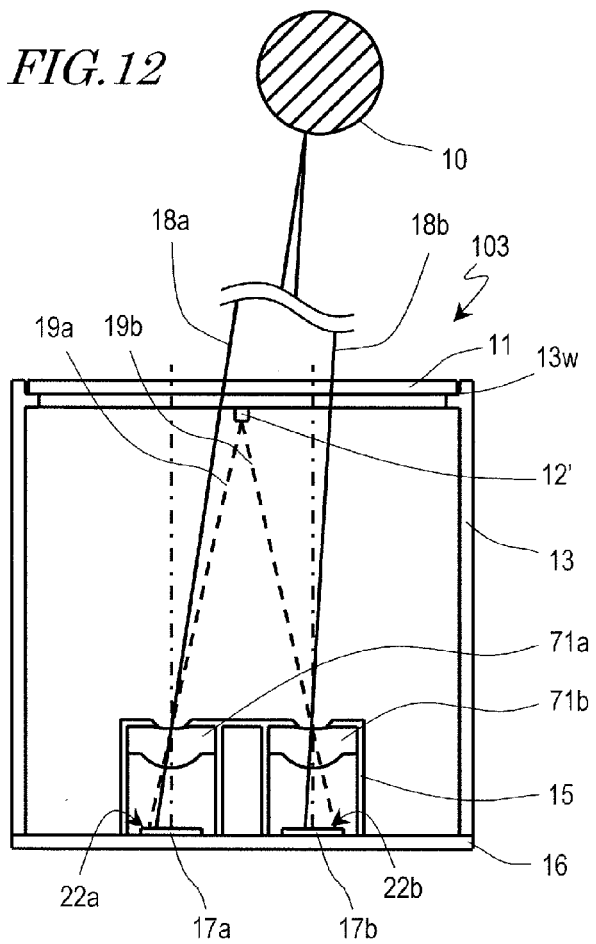
[FIG. 12] A perspective view showing a third embodiment of the distance measuring apparatus according to the present invention.

Hereinafter, a third embodiment of the distance measuring apparatus according to the present invention will be described. FIG. 12 is a cross-sectional view of a distance measuring apparatus 103 as seen from an upper direction. The distance measuring apparatus 103 of the present embodiment differs from the distance measuring apparatus 101 of the first embodiment in that optical systems 71a and 71b composed of diffractive lenses having a diffraction grating on at least one face thereof are comprised, instead of the optical systems 14a and 14b in the distance measuring apparatus 101 of the first embodiment.

Figure 13:
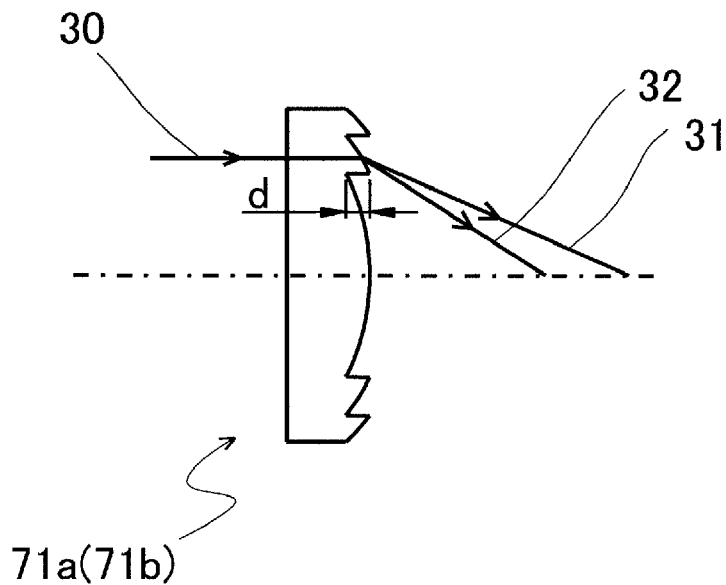
[FIG. 13] A diagram showing the structure of an optical system of the distance measuring apparatus of FIG. 12.

The optical systems 71a and 71b of the present embodiment have sawtooth diffraction gratings exhibiting a high diffraction efficiency with respect to a specific order and wavelength, called blazed diffraction gratings. FIG. 13 shows a cross-sectional structure of the optical systems 71a and 71b, and as shown in FIG. 13, a blazed diffraction grating is formed on one surface of the optical systems 71a and 71b.

When parallel light 30 enters the optical systems 71a and 71b, $+1^{st}$ order diffracted light due to light of wavelength λ1 travels through an optical path 31 to converge, and $+2^{nd}$ order diffracted light due to light of a wavelength λ2 travels through an optical path 32 to converge. Each blazed diffraction grating has a stepped portion d.

A diffraction efficiency η of a diffractive lens having such a blazed diffraction grating is described in "Zohokaitei-Ban Kaisetsu Kogakusoshi Nyumon (or "Basics of Diffraction Optical Devices, Augmented And Revised") p. 150-p. 151", and can be expressed by (eq. 11) and (eq. 12).

$$\eta = \left[ \frac{\sin\{\pi(\phi(\lambda) - m)\}}{\pi(\phi(\lambda) - m)} \right]^2 \quad [\text{eq. 11}]$$

$$\phi(\lambda) = \frac{\{n(\lambda) - 1\}d}{\lambda} \quad [\text{eq. 12}]$$

Figure 14:
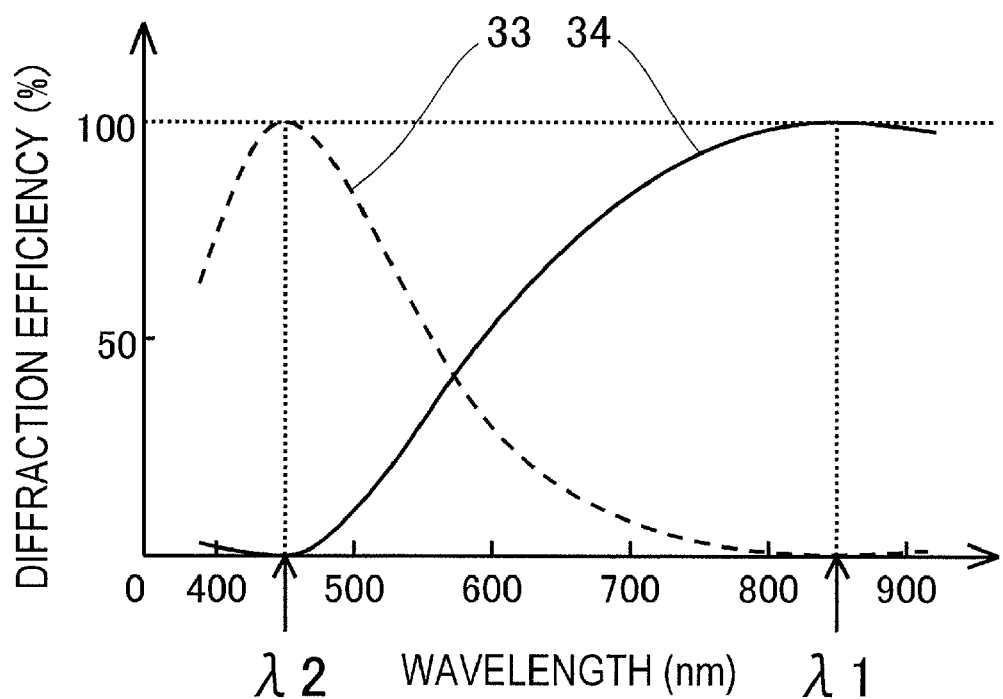
[FIG. 14] A graph showing a relationship between wavelength and diffraction efficiency in the optical systems of the distance measuring apparatus of FIG. 12.

Herein, m is an order of diffraction; λ is a wavelength; and n(λ) is a refractive index of a lens at the wavelength λ. In (eq. 11) and (eq. 12), when a lens material having a refractive index of 1.5247 at the sodium d line wavelength and an Abbe number of 56.2 is used, assuming d=1.64 μm, wavelength and diffraction efficiency will have a relationship between as shown in FIG. 14. FIG. 14 shows a curve 34 of diffraction efficiency of +1$^{st}$ order diffracted light, and a curve 33 of diffraction efficiency of +2$^{nd}$ order diffracted light. As shown in FIG. 14, the diffraction efficiency of +1$^{st}$ order diffracted light becomes substantially 100% at λ1=850 nm. The diffraction efficiency of +2$^{nd}$ order diffracted light becomes substantially 100% at λ2=450 nm. Therefore, by imaging the object for distance measurement in a near-infrared light wavelength band, where a high diffraction efficiency is obtained including the wavelength λ1, a high imaging performance is ensured. Moreover, the wavelength band of +2$^{nd}$ order diffracted light in which a high diffraction efficiency is obtained is narrower than that of +1$^{st}$ order diffracted light, but the wavelength band of LED light is also narrow. Therefore, by ensuring that a blue LED 12 as the reference object has a dominant wavelength which is substantially equal to λ2, a high imaging performance can be ensured.

Moreover, as shown in FIG. 13, the shorter-wavelength +2$^{nd}$ order diffracted light 32 form images at a shorter distance than does the longer-wavelength +1$^{st}$ order diffracted light 31. Therefore, based on the imaging plane, the shorter-wavelength +2$^{nd}$ order diffracted light focuses in a narrow range of short distances, whereas the longer-wavelength +1$^{st}$ order diffracted light focuses in a broad range of relatively long distances. Thus, since the optical systems 71a and 71b have diffraction gratings, the object for distance measurement and the reference object can form image in the imaging regions 22a and 22b of the imaging sections 17a and 17b in a similar manner to the first embodiment.

An exemplary design of the optical systems of the present embodiment will be described. Table 4 to Table 7 show design parameters of the optical systems 71a and 71b.

TABLE 4 object for distance measurement
wavelength = 850 nm (diffracted light +
1$^{st}$ order), focal length = 2.8 mm,
effective F value = 2.78
angle of view 2ω = 47.2°, effective
imaging circle diameter = φ2.32 mm

| surface number | ri | di | nd | νd |
|---|---|---|---|---|
| object | ∞ | 400 | — | — |
| aperture | ∞ | 0.03 | — | — |
| R1 surface | −6 | 1.3 | 1.5247 | 56.2 |
| R2 surface | −1.323 | 3 | — | — |
| image surface | ∞ | — | — | — |

TABLE 5 object for distance measurement
wavelength = 450 nm, focal length = 2.70 mm,
effective F value = 2.74
angle of view 2ω = 47.8°, effective
imaging circle diameter = φ2.32 mm

| surface number | ri | di | nd | νd |
|---|---|---|---|---|
| object | ∞ | 55 | — | — |
| aperture | ∞ | 0.03 | — | — |
| R1 surface | −6 | 1.3 | 1.585 | 30 |
| R2 surface | −1.323 | 3 | — | — |
| image surface | ∞ | — | — | — |

TABLE 6

| | aspheric coefficient | | | | | |
|---|---|---|---|---|---|---|
| surface number | k | A4 | A6 | A8 | A10 | A12 |
| R1 surface | −178.1692 | −0.214852 | −0.013330 | 0.242884 | −0.952034 | 1.461589 |
| R2 surface | −0.685383 | −0.021926 | −0.103573 | 0.306476 | −0.355464 | 0.111969 |

TABLE 7

| | aspheric coefficient | | | | |
|---|---|---|---|---|---|
| surface number | B2 | B4 | B6 | B8 | B10 |
| R2 surface | 81.821866 | 32.639187 | −224.14029 | 786.35613 | −632.31831 |

The optical system 71a and the optical system 71b are lenses of the same characteristics, each having an R1 surface and an R2 surface. ω represents a half angle of view along diagonals; ri represents a radius of curvature (mm) of each surface; di represents an inter-surface-center interval (mm) of each surface; nd represents a refractive index of the lens; and νd represents an Abbe number of the lens. Moreover, an aspherical shape is expressed by (eq. 3), where r is a paraxial radius of curvature; k is a conical constant; and $A_m$ (m=4,6,8,10,12) is an m$^{th}$ aspheric coefficient, assuming that distance from a tangent plane of the surface vertex along the optical axis direction is x, and that height from the optical axis is h, as in the first embodiment. Moreover, a phase difference function φ(h) at the diffraction plane (R2 surface) is expressed by (eq. 13) in units of radians, assuming that height from the optical axis is h, and that Bn(n=2,4,6,8,10) is an n$^{th}$ phase function coefficient.

$$\phi(h)=B_2h^2+B_4h^4+B_6h^6+B_8h^8+B_{10}h^{10} \quad [\text{eq. 13}]$$

Figure 15:
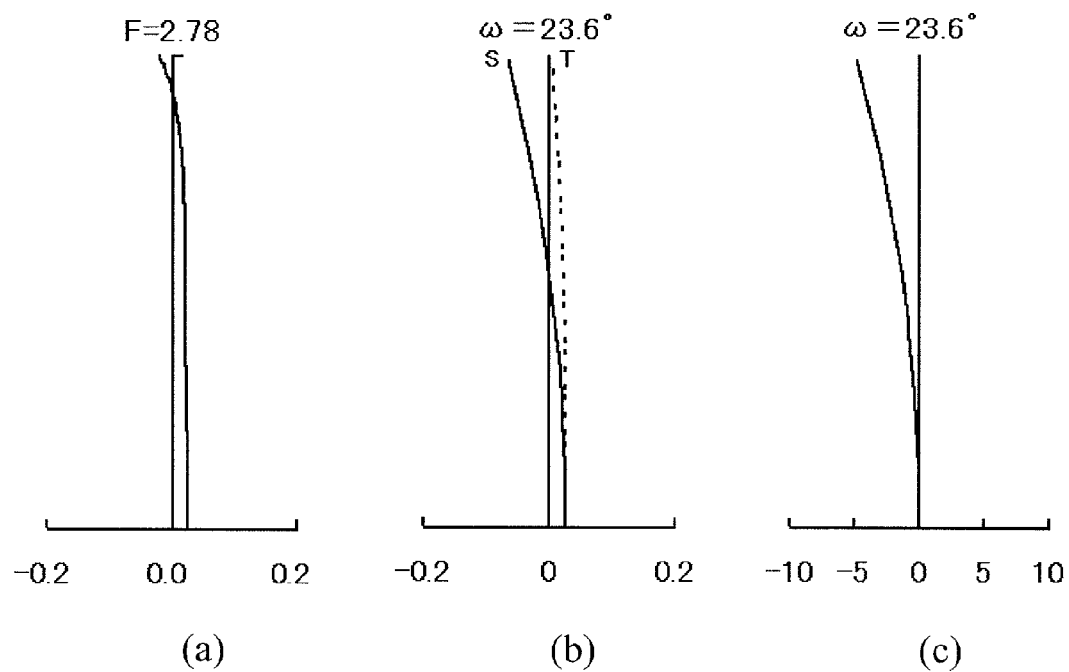
[FIG. 15] (a) to (c) are diagrams showing spherical aberration, astigmatism, and distortion in the case where an object at a position of 400 mm from imaging sections is imaged by using light of a wavelength of 850 nm in the optical systems of the distance measuring apparatus of FIG. 12.
Figure 16:
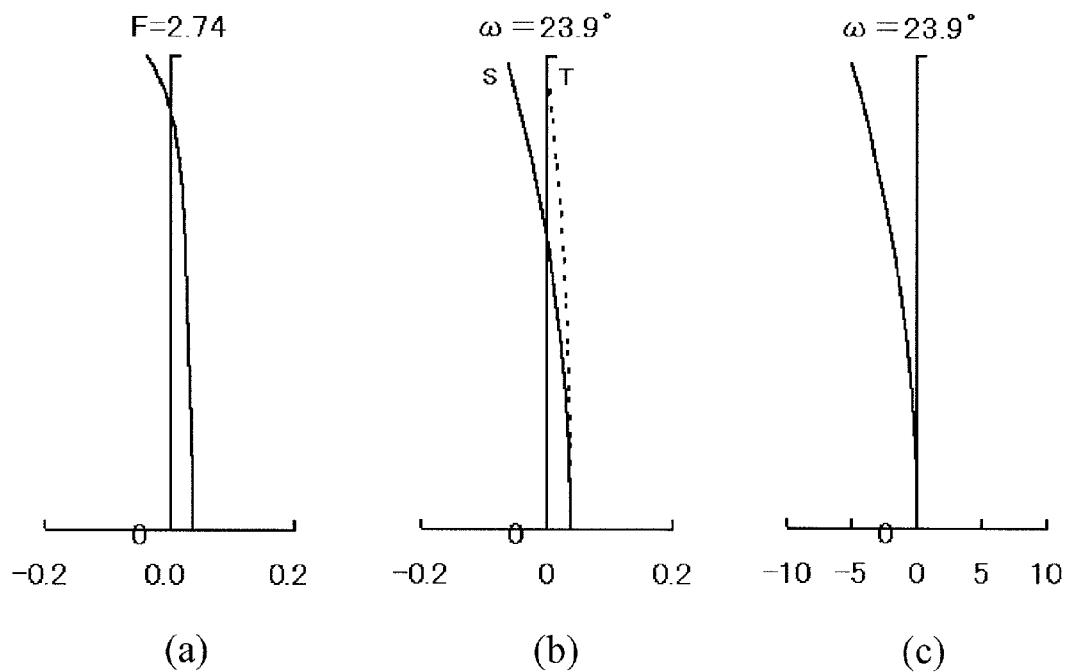
[FIG. 16] (a) to (c) are diagrams showing spherical aberration, astigmatism, and distortion in the case where an object at a position of 55 mm from imaging sections is imaged by using light of a wavelength of 450 nm in optical systems of the distance measuring apparatus of FIG. 12.

FIGS. 15(a) to (c) are aberration diagrams showing spherical aberration, astigmatism, and distortion of an object for distance measurement which is at 400 mm from the imaging sections 17a and 17b, in the case where the optical systems 71a and 71b have the optical characteristics shown in Table 2 and where light of a wavelength of 850 nm is used as light of the second wavelength band. FIGS. 16(a) to (c) are aberration diagrams showing spherical aberration, astigmatism, and distortion of a reference object which is at 55 mm from the imaging sections 17a and 17b, in the case where the optical systems 71a and 71b have the optical characteristics shown in Table 2 and where light of a wavelength of 450 nm is used as light of the first wavelength band. As is clear from a comparison between FIGS. 15(a) to (c) and FIGS. 16(a) to (c), the optical performances are about the same in the two cases, as in the first embodiment. This indicates that about the same optical performance can be obtained between the case where an object for distance measurement is placed at a position of 400 mm and imaged with a wavelength of 850 nm (near-infrared light) and the case where a reference object is placed at a position of 55 mm and imaged with a wavelength of 450 nm (blue light). Thus, by using diffractive lenses for the optical systems, and imaging the object for distance measurement with diffracted light of the first order of diffraction and imaging the reference object with diffracted light of the second order of diffraction, even if the reference object is placed at a position on the order of several centimeters from the imaging sections, its picture can be imaged with similar optical characteristics to those of an object for distance measurement which is far, as in the case of refractive lenses. Therefore, the parallax amount of the object for distance measurement can be correctly corrected by using a parallax amount which is obtained with a picture of the reference object thus placed.

Although $+1^{st}$ order diffracted light and $+2^{nd}$ order diffracted light are utilized in the present embodiment, the combination of orders of diffraction and wavelengths is not limited thereto, but any other orders of diffraction and wavelengths may be combined.

Fourth Embodiment

Figure 17:
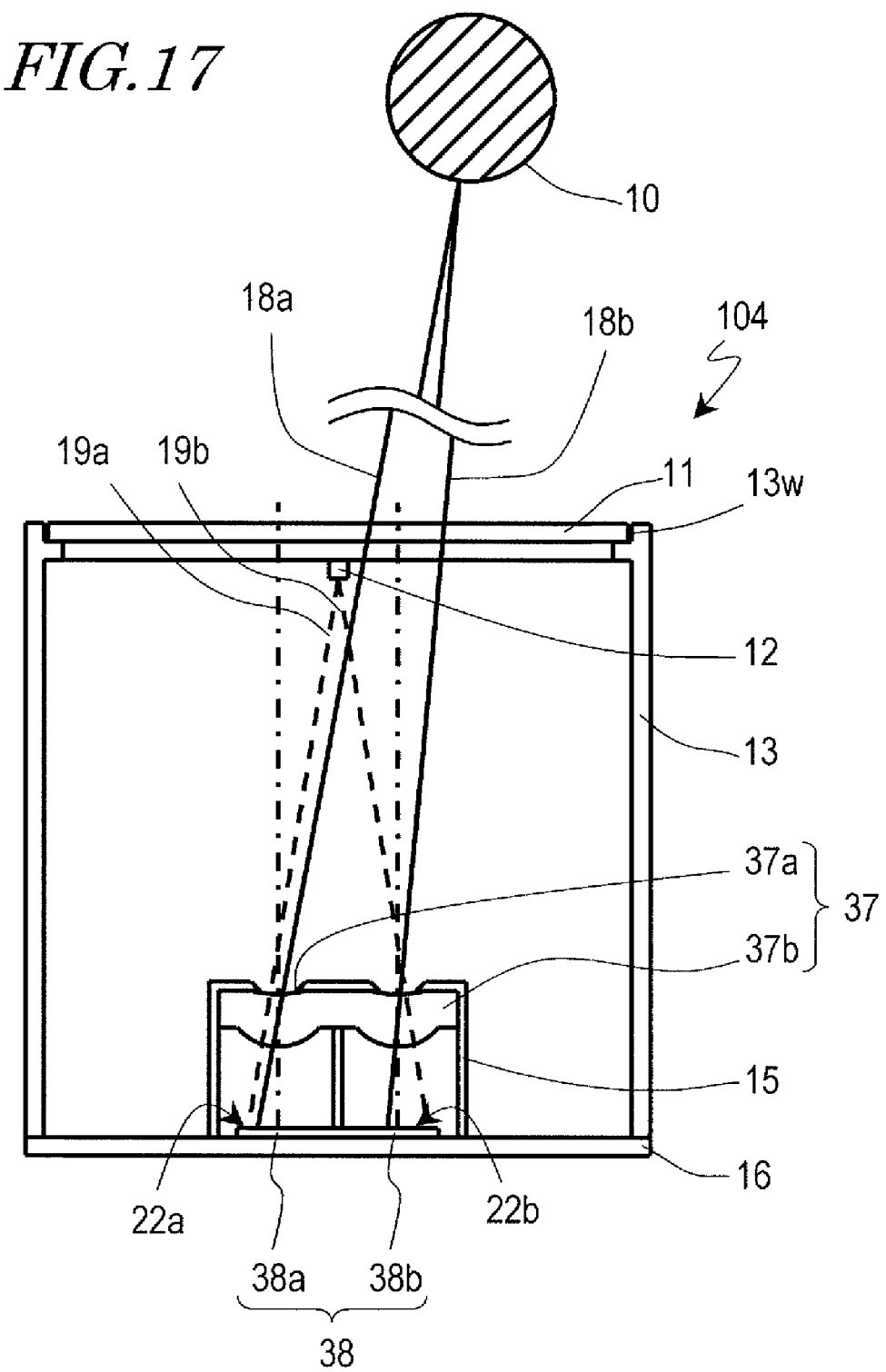
[FIG. 17] A cross-sectional view showing a fourth embodiment of the distance measuring apparatus according to the present invention.

Hereinafter, a fourth embodiment of the distance measuring apparatus according to the present invention will be described. FIG. 17 is a cross-sectional view of a distance measuring apparatus 104 as seen from an upper direction. The distance measuring apparatus 104 of the present embodiment differs from the distance measuring apparatus 101 of the first embodiment in that an optical system 37 is included instead of the optical systems 14a and 14b of the distance measuring apparatus 101 of the first embodiment and that an imaging element 38 is included instead of the imaging sections 17a and 17b.

The optical system 37 includes two image-formation lens portions 37a and 37b, the two image-formation lens portions 37a and 37b being integrally formed. Moreover, the imaging element 38 includes an imaging section 38a having an imaging region 22a and an imaging section 38b having an imaging region 22b, such that the imaging sections 38a and 38b are integrally formed. The imaging element 38 may include one large imaging region, such that the large imaging region includes the imaging regions 22a and 22b.

The image-formation lens portions 37a and 37b of the optical system 37 allow images of the object 10 for distance measurement and the reference object 12 to be formed in the imaging regions 22a and 22b of the imaging sections 38a and 38b, respectively. As a result, similarly to the first embodiment, a small-sized distance measuring apparatus having a high accuracy can be realized. In particular, the two image-formation lens portions 37a and 37b of the optical system 37 are formed integrally, and the imaging sections 38a and 38b are also formed integrally in the present embodiment.

In the case where image-formation lenses of two optical systems are separately-formed two optical parts, there are possibilities that variations in the characteristics of the two optical parts may cause differences in the degrees of temperature changes and aging of characteristics, and differences may occur in the positional shifts due to vibration and the like, because the two image-formation lenses are separately supported. Similar differences may also occur in the case where the two imaging sections are two parts. In this case, not only the base line length as the interval between the optical axes of the two optical systems will change, but also the positions of the optical axes in the two imaging regions will also change quite independently, in complicated manners. Moreover, there is a possibility that, in each imaging region, the amount of change in the parallax amount may differ between the first region for imaging the reference object and the second region for imaging the object for distance measurement. As a result, there is a possibility that the accuracy of the correction of parallax amount may be deteriorated.

On the other hand, in the case where image-formation lenses of two optical systems are integrally formed, or the two imaging sections are integral, influences of variations in the characteristics of the two parts and independent positional shifts ascribable to the parts being independently supported can be reduced. Moreover, as compared to a construction based on two parts, influences of expansion or contraction of parts due to temperature changes and positional shifts due to vibration or the like are likely to occur to the same extent in the two image-formation lens portions and imaging sections, so that the accuracy of the correction of the parallax amount is improved, and deteriorations and fluctuations in the accuracy of distance measurement due to temperature changes can be suppressed.

Moreover, by placing a plurality of imaging regions on a single imaging element, a distance measuring apparatus which is even smaller in size can be realized.

Fifth Embodiment

Figure 18:
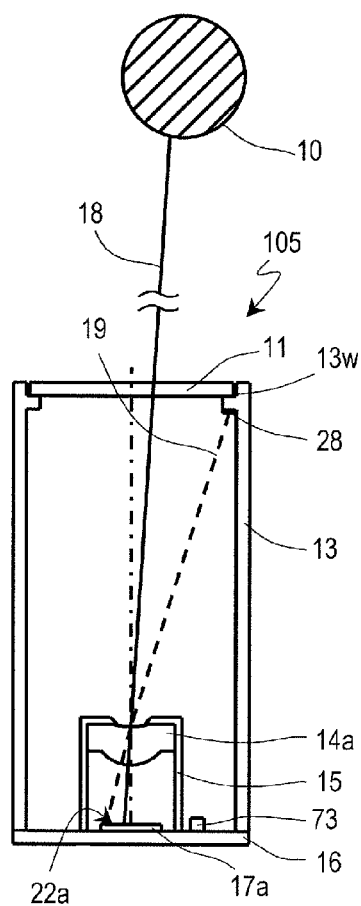
[FIG. 18] A cross-sectional view showing a fifth embodiment of the distance measuring apparatus according to the present invention.

Hereinafter, a fifth embodiment of the distance measuring apparatus according to the present invention will be described. FIG. 18 is a cross-sectional view of a distance measuring apparatus 105 as seen from a lateral direction. The distance measuring apparatus 105 of the present embodiment differs from the distance measuring apparatus 101 of the first embodiment in that a reference object 28 which is composed of a reflection pattern and a light source 73 which is disposed at a different place from the reference object 28 are provided.

The light source 73 is supported on the substrate 16, for example, and emits light of the first wavelength band. For example, the light source 73 is a blue LED. The reference object 28 is composed of a pattern which causes scatter reflection of light of the first wavelength band from the light source 73, and is provided at the position of the reference object 12 as described in the first embodiment.

In the first embodiment, the reference object 12 is an LED, and there may be size and shape limitations depending on the type of the LED. However, in the present embodiment, the reference object 28 is a pattern, so that its size and shape can be freely set. Since the pattern matching accuracy of a picture for calculating a parallax amount depends on the type of imaging pattern, the detection accuracy of a parallax amount can be enhanced by optimizing the shape of the pattern of the reference object. For the detection of a parallax amount through pattern matching, it is preferable to use a pattern having a high contrast along the base line direction. For example, by choosing stripes which are orthogonal to the base line direction as the pattern of the reference object 28, it becomes possible to enhance the detection accuracy of the parallax amount.

Moreover, by adopting a reflection pattern for the reference object 28, the light source 73 can be allowed to be provided on the substrate 16. Since there is no need to provide wiring for the housing 13 and dispose a light-emitting device at a position for impinging on the optical systems 14a and 14b as in the first embodiment, the structure of the distance measuring apparatus 105 can be simplified.

Although the reference object 28 is provided on the housing 13 in FIG. 18, the reference object 28 may be provided on the optical filter 11. Since the reference object 28 has a planar shape, it can be easily formed on the optical filter 11. Moreover, since the reference object 28 is a reflection pattern, even if white external light enters from the side where the object 10 for distance measurement is, the reference object 28 is not affected by the external light, and as the reflection pattern reflects the light of the first wavelength band emitted from the light source 73, the reference object can be imaged with light of the first wavelength banded.

Sixth Embodiment

Figure 19:
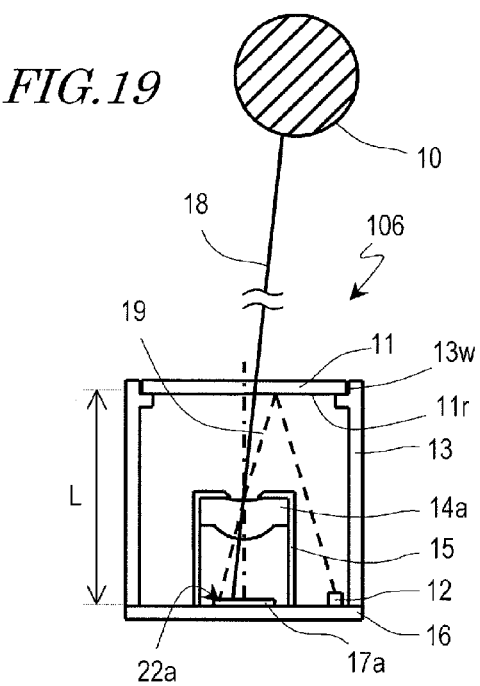
[FIG. 19] (a) is a cross-sectional view showing a sixth embodiment of the distance measuring apparatus according to the present invention; and (b) is a cross-sectional view showing a variant thereof.
Figure 19:
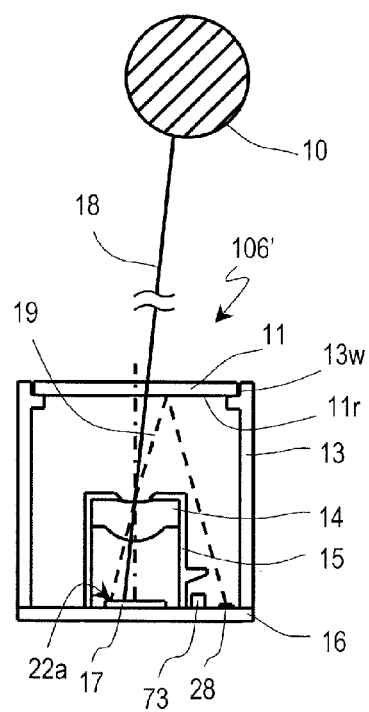

Hereinafter, a sixth embodiment of the distance measuring apparatus according to the present invention will be described. FIG. 19(a) is a cross-sectional view of a distance measuring apparatus 106 as seen from a lateral direction. The distance measuring apparatus 106 of the present embodiment differs from the first embodiment in that the reference object 12 is provided on the substrate 16, and that the reference object 12 is imaged via regular reflection at an inner surface 11r of the optical filter 11.

Similarly to the first embodiment, the reference object 12 emits light of the first wavelength band. An image of the reference object 12 by the light of the first wavelength band provided on the substrate 16 undergoes regular reflection at the reflection surface 11r of the optical filter 11, impinges on the optical systems 14a and 14b, whereby images are formed in the imaging regions 22a and 22b of the imaging sections 17a and 17b.

Figure 20:
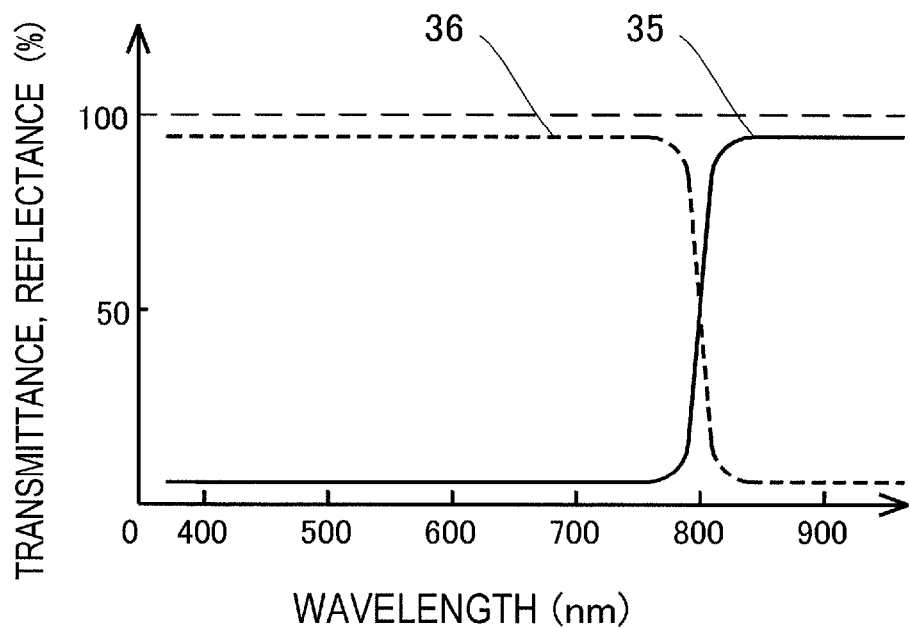
[FIG. 20] A characteristic diagram of an optical filter in the distance measuring apparatus of FIG. 19(a).
Figure 21:
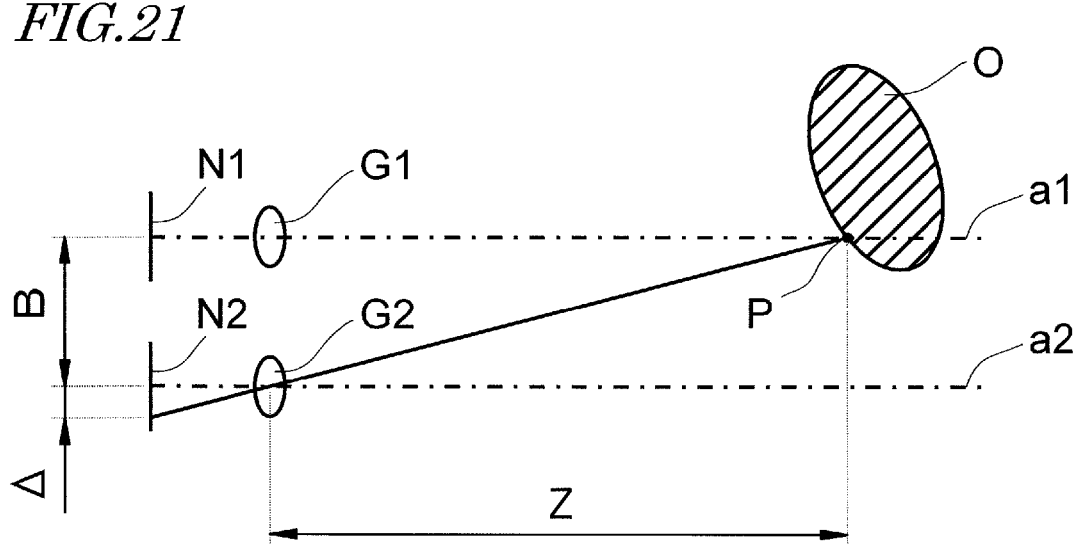
[FIG. 21] A diagram describing triangulation in a distance measuring apparatus.

The optical filter 11 is an optical filter such that a dielectric multilayer film or the like which transmits light of a near-infrared band and reflects light of a visible band is formed on the surface of glass. FIG. 20 shows the optical characteristics of the optical filter 11. In FIG. 20, a curve 35 represents transmittance, whereas a curve 36 represents reflectance. Because the optical filter 11 has such characteristics, an image of the reference object 12 by blue light, which is visible light, undergoes regular reflection at the reflection surface 11r of the optical filter 11. In the present embodiment, the image of the reference object 12 impinges on the optical systems 14a and 14b via regular reflection, instead of scatter reflection as in the fifth embodiment. In other words, an optical path 19 from the reference object 12 to the imaging sections 17a and 17b can turn around at the reflection surface 11r. As a result, the distance L from the reflection surface 11r and the imaging sections 17a and 17b can be a half of the focusing distance of light of the optical systems 14a and 14b based on the first wavelength band. For example, if the focusing distance is 33 mm, the distance L may be 16.5 mm. Therefore, the outer shape of the distance measuring apparatus 106 can be made smaller.

Moreover, the reference object does not need to emit light, but may be a pattern which causes scatter reflection of light from another light source. A distance measuring apparatus 106' shown in FIG. 19(b) includes a light source 73 provided on a substrate 16, and a reference object 28 which is provided on the substrate 16 from a pattern which causes scatter reflection of light from the light source 73. The light source 73 emits light of the first wavelength band, and the light from the light source 73 undergoes scatter reflection at the reference object 28. An image of the reference object 28 by light of the first wavelength band undergoes regular reflection at the reflection surface 11r of the optical filter 11, and impinges on the optical systems 14a and 14b. As a result, images of the reference object 28 are formed in the imaging regions 22a and 22b of the imaging sections 17a and 17b.

Since the reference object 28 is composed of a scatter pattern, its size and shape can be freely set. Therefore, as described in the fifth embodiment, by optimizing the pattern shape of the reference object, the detection accuracy of the parallax amount can be enhanced.

Thus, according to the present embodiment, an optical path from a reference object to the imaging sections can turn around by utilizing regular reflection at the optical filter. Therefore, the reference object can be disposed behind the optical systems, thus making it possible to downsize the distance measuring apparatus as compared to a construction where a reference object is directly imaged.

In the embodiment, an optical filter 11 is used in which a dielectric multilayer film or the like that transmits a near-infrared light wavelength band and reflects a visible light wavelength band is formed on the surface of glass. However, an optical filter may be used in which a light-absorbing substance dispersed in glass absorbs visible light, such that near-infrared light is transmitted. Even in the case of a filter which absorbs visible light, the filter surface has slight reflectance, so that an image of the reference object 12 composed of a light-emitting device or the reference object 28 composed of a scatter reflection pattern can be imaged.

Moreover, a reflection surface which reflects an image of the reference object 12 or the reference object 28 may be provided anywhere else besides the optical filter 11.

The first to sixth embodiments above can be practiced in combination as appropriate. For example, the distance measuring apparatus 102 of the second embodiment and the characteristic constructions of the third to fifth embodiments may be combined; the distance measuring apparatus 103 of the third embodiment may be combined with the characteristic constructions of the fourth to sixth embodiments; or the distance measuring apparatus 104 of the fourth embodiment may be combined with the characteristic constructions of the fifth to sixth embodiments. Moreover, three or more embodiments may be practiced in combination.

Moreover, in the first to sixth embodiments above, an image of the reference object is generated by using a light source in the first wavelength band or an optical filter, and an image of the object for distance measurement is generated by using an optical filter and utilizing light of the second wavelength band. However, for example, an imaging element in which RGB filters are arranged in a Bayer array in each pixel, or an imaging element in which filters which transmit the first wavelength band and filters which transmit the second wavelength band are disposed in a staggered manner in each pixel may be used, and an image of the object for distance measurement and an image of the reference object which are generated by white light such as external light may be straightforwardly imaged by imaging elements, and through signal processing, an image by light of the first wavelength band may be extracted from the image of the reference object by white light and an image by light of the second wavelength band may be extracted from the image of the object for distance measurement by white light. By using images which are obtained by such a method to calculate a parallax amount of the reference object and a parallax amount of the object for distance measurement, and by using an amount of change from an initial value of the parallax amount of the reference object to correct the parallax amount of the object for distance measurement, the accuracy of distance measurement can also be enhanced. In this case, the filters are not limited to the aforementioned combinations, but a plurality of filters which transmit light of four or more different wavelength bands may be disposed in each pixel.

Moreover, in the first to sixth embodiments above, parallax amounts of the object for distance measurement and the reference object are obtained by using two optical systems. However, a distance measuring apparatus including three or more optical system may be realized. In this case, since two or more parallax amounts of the object for distance measurement and two or more parallax amounts of the reference object are obtained, distance measurement with a higher accuracy can be performed by using their average values.

INDUSTRIAL APPLICABILITY

The distance measuring apparatus according to the present invention is applicable to distance measuring apparatuses for various purpose, and is suitably used as distance measuring apparatuses for on-board use, monitoring cameras, three-dimensional shape measurement, and so on.

The invention claimed is:

1. A distance measuring apparatus for measuring a distance to an object based on a parallax of images obtained with a plurality of optical systems, comprising:
    a reference object being structurally part of the distance measuring apparatus;
    a plurality of optical systems for imaging an object for distance measurement and the reference object;
    an imaging section having a plurality of imaging regions having a one-to-one correspondence with the plurality of optical systems, the imaging section converting images of the object for distance measurement and the reference object formed in respective imaging regions by the plurality of optical systems into electrical signals; and
    a calculation section, wherein,
    the calculation section
    generates, from the electrical signals, a plurality of picture data of the reference object by light of a first wavelength band received from the reference object in the plurality of imaging regions and a plurality of picture data of the object for distance measurement by light of a second wavelength band received from the object for distance measurement in the plurality of imaging regions, the second wavelength band being longer in wavelength than is the first wavelength band;
    calculates a parallax amount of the reference object and a parallax amount of the object for distance measurement, respectively, from the plurality of picture data of the reference object and the plurality of picture data of the object for distance measurement; and
    based on the parallax amount of the reference object and an initial value of the parallax amount of the reference object, corrects the parallax amount of the object for distance measurement, and calculates a distance to the object for distance measurement by using the corrected parallax amount of the object for distance measurement.

2. The distance measuring apparatus of claim 1, further comprising an optical filter for selectively transmitting light of the second wavelength band, the optical filter being disposed on optical paths between the plurality of optical systems and the object for distance measurement, wherein
    the reference object emits or reflects light of the first wavelength band, and is disposed so that the emitted or reflect light reaches the plurality of optical systems without being transmitted through the optical filter.

3. The distance measuring apparatus of claim 1, wherein,
    the imaging regions of the imaging section include a first region in which to image the reference object and a second region in which to image the object for distance measurement; and
    in each imaging region, the imaging section includes at least one of a first optical filter which is provided so as to cover the first region and selectively transmits light of the first wavelength band and a second optical filter which is provided so as to cover the second region and selectively transmits light of the second wavelength band.

4. The distance measuring apparatus of claim 1, wherein,
    the imaging section includes in each pixel a plurality of filters for transmitting light of respectively different wavelength bands, and images the reference object and the object for distance measurement with white light; and
    from picture data of the reference object and the object for distance measurement by white light as obtained from the plurality of imaging elements, the calculation section generates the plurality of picture data of the reference object by light of the first wavelength band of the reference object and the plurality of picture data of the object for distance measurement by light of the second wavelength band of the object for distance measurement, the second wavelength band being different from the first wavelength band.

5. The distance measuring apparatus of claim 1, wherein the reference object is placed near a focusing distance of the plurality of optical systems based on light of the first wavelength band.

6. The distance measuring apparatus of claim 1, wherein each of the plurality of optical systems includes a diffractive lens having a diffraction grating formed on at least one face thereof, and the diffractive lens forms an image of the reference object with diffracted light, by a first order of diffraction, of light of the first wavelength band, and forms an image of the object for distance measurement with diffracted light, by a second order of diffraction, of light of the second wavelength band.

7. The distance measuring apparatus of claim 1, wherein each of the plurality of optical systems includes an image-formation lens, the plurality of image-formation lenses being integrally formed.

8. The distance measuring apparatus of claim 1, wherein the imaging section is one imaging element, such that the plurality of imaging regions are provided in the one imaging element.

9. The distance measuring apparatus of claim 5, further comprising a light source for emitting light of the first wavelength band, wherein
    the reference object causes diffuse reflection of light from the light source.

10. The distance measuring apparatus of claim 5, wherein the reference object is a light source for emitting light of the first wavelength band.

11. The distance measuring apparatus of claim 10, further comprising a reflection surface which is disposed so as to allow light from the reference object to be reflected and enter the plurality of optical systems.

12. A distance measuring method, by using a distance measuring apparatus including a reference object being structurally part of the distance measuring apparatus, a plurality of optical systems for imaging an object for distance measurement and the reference object, an imaging section having imaging regions having a one-to-one correspondence with the plurality of optical systems, the imaging section converting images of the object for distance measurement and the reference object formed in the respective imaging regions by the plurality of optical systems into electrical signals, of measuring a distance to an object based on a parallax of images with the plurality of optical systems, comprising:

a step of generating, from the electrical signals, a plurality of picture data of the reference object by light of a first wavelength band received from the reference object in the plurality of imaging regions and a plurality of picture data of the object for distance measurement by light of a second wavelength band received from the object for distance measurement in the plurality of imaging regions, the second wavelength band being longer in wavelength than the first wavelength band;

a step of calculating the parallax amount of the reference object and the parallax amount of the object for distance measurement, respectively, from the plurality of picture data of the reference object and the plurality of picture data of the object for distance measurement; and a step of, based on the parallax amount of the reference object and an initial value of the parallax amount of the reference object, correcting the parallax amount of the object for distance measurement, and calculating a distance to the object for distance measurement by using the corrected parallax amount of the object for distance measurement.

* * * * *